United States Patent
Tagawa

(10) Patent No.: US 6,594,782 B1
(45) Date of Patent: Jul. 15, 2003

(54) INFORMATION PROCESSING APPARATUS

(75) Inventor: Koutarou Tagawa, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/422,864

(22) Filed: Oct. 25, 1999

(30) Foreign Application Priority Data

Dec. 28, 1998 (JP) .......................................... 10-372851

(51) Int. Cl.$^7$ ................................................ G06F 11/00
(52) U.S. Cl. ............................ 714/30; 714/45; 712/227
(58) Field of Search ............................. 714/30, 39, 45, 714/49, 50, 53, 54; 712/227, 233, 240

(56) References Cited

U.S. PATENT DOCUMENTS

| | | | | |
|---|---|---|---|---|
| 5,463,746 A | * | 10/1995 | Brodnax et al. | 712/240 |
| 5,832,205 A | * | 11/1998 | Kelly et al. | 711/204 |
| 5,978,902 A | * | 11/1999 | Mann | 712/227 |
| 6,009,270 A | * | 12/1999 | Mann | 717/128 |
| 6,142,683 A | * | 11/2000 | Madduri | 703/23 |
| 6,247,146 B1 | * | 6/2001 | Wheatley et al. | 712/236 |
| 6,347,383 B1 | * | 2/2002 | Elnozahy | 709/315 |
| 6,351,844 B1 | * | 2/2002 | Bala | 712/209 |
| 6,418,530 B2 | * | 7/2002 | Hsu et al. | 711/202 |

FOREIGN PATENT DOCUMENTS

| | | |
|---|---|---|
| JP | 62-86442 | 4/1987 |
| JP | 2-205937 | 8/1990 |
| JP | 4-287241 | 10/1992 |
| JP | 4-287242 | 10/1992 |
| JP | 5-158734 | 6/1993 |
| JP | 9-114692 | 5/1997 |

* cited by examiner

Primary Examiner—Robert Beausoliel
Assistant Examiner—Bryce P. Bonzo
(74) Attorney, Agent, or Firm—Staas & Halsey LLP

(57) ABSTRACT

A conflict detection unit monitors an input of branch information and an input of data access information. When an output data selection unit receives a notification from the conflict detection unit that there has arisen the conflict between the input of the branch information and the input of the data access information, the output data selection unit outputs branch information, and then data access information delayed by a delay unit, thereby outputting trace data.

16 Claims, 17 Drawing Sheets

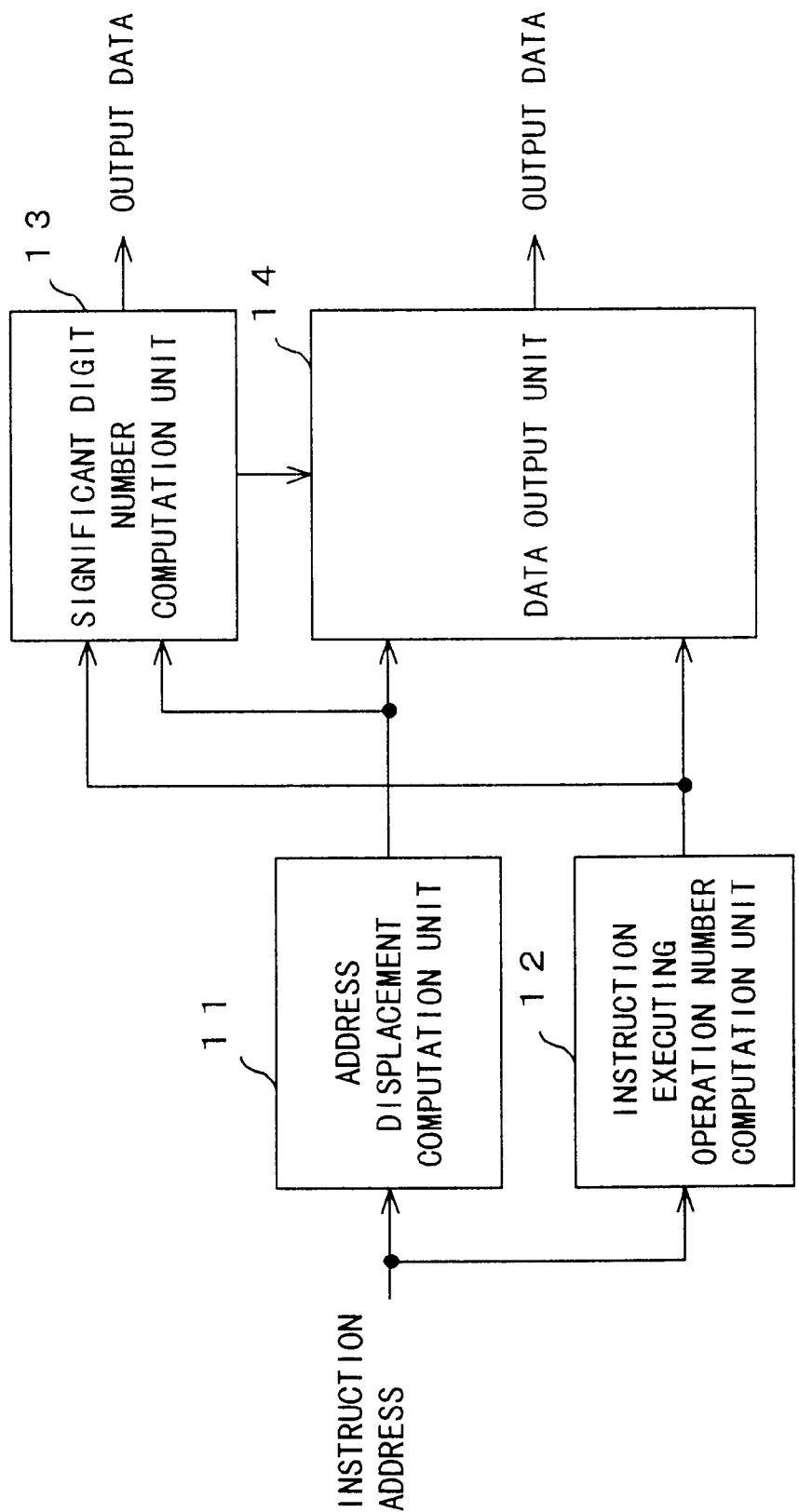
F I G. 5

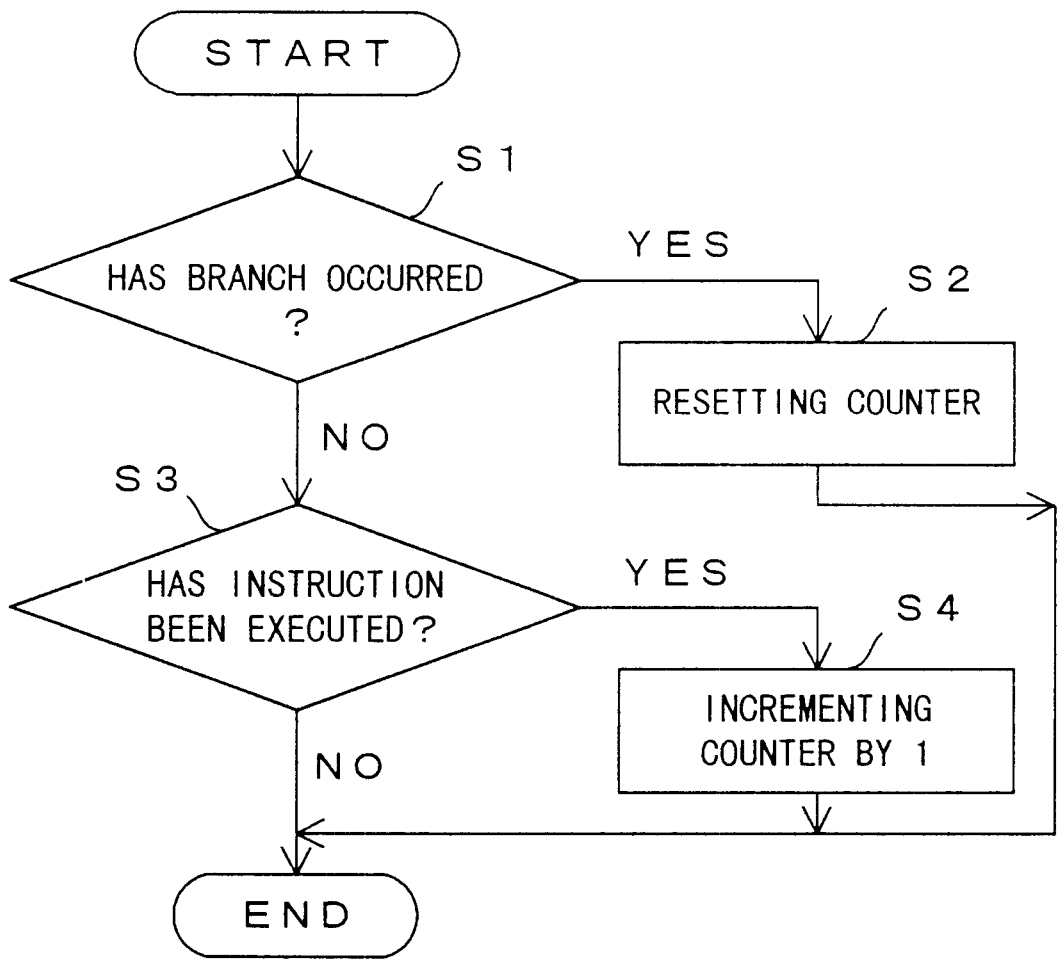
F I G. 9

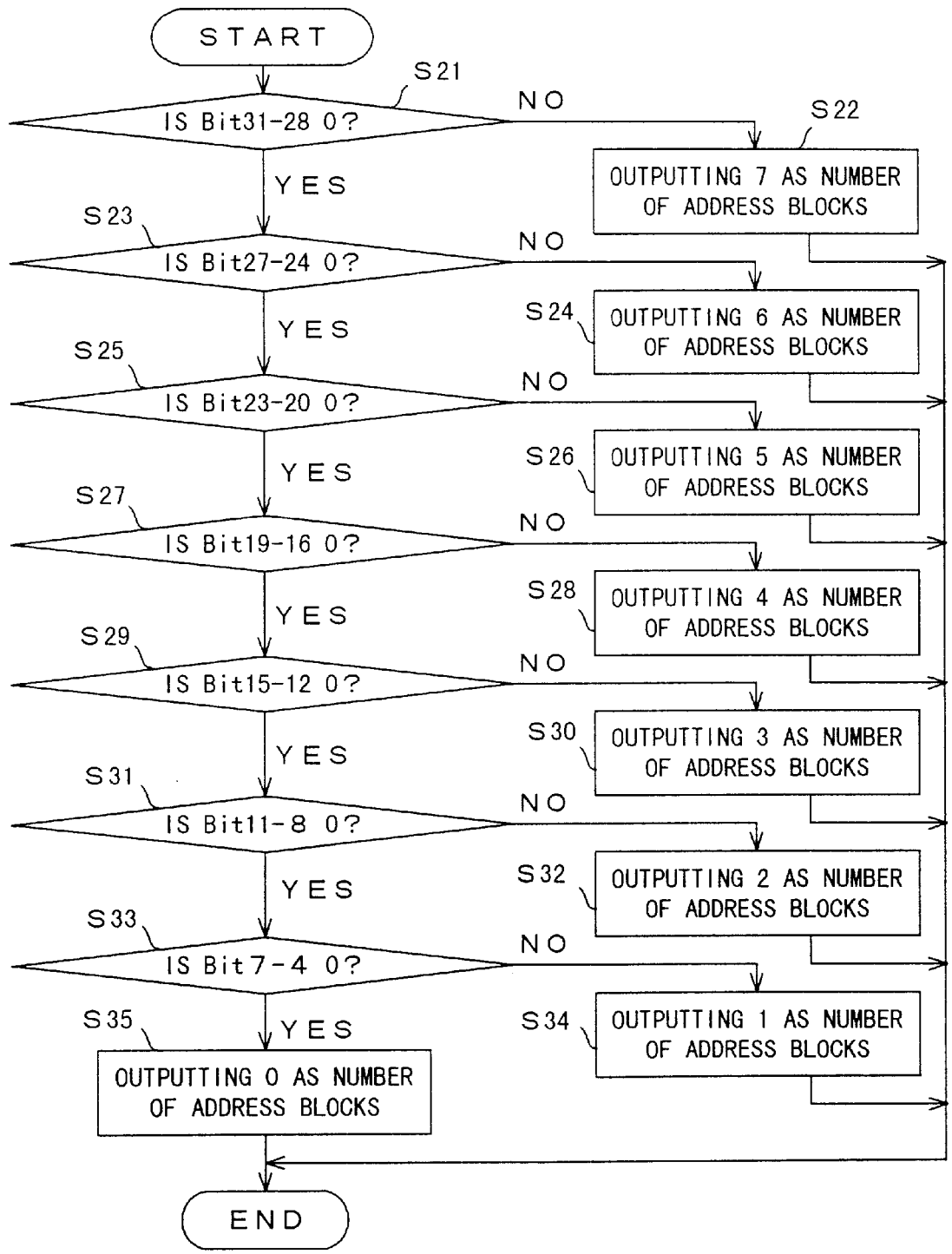
F I G. 1 3

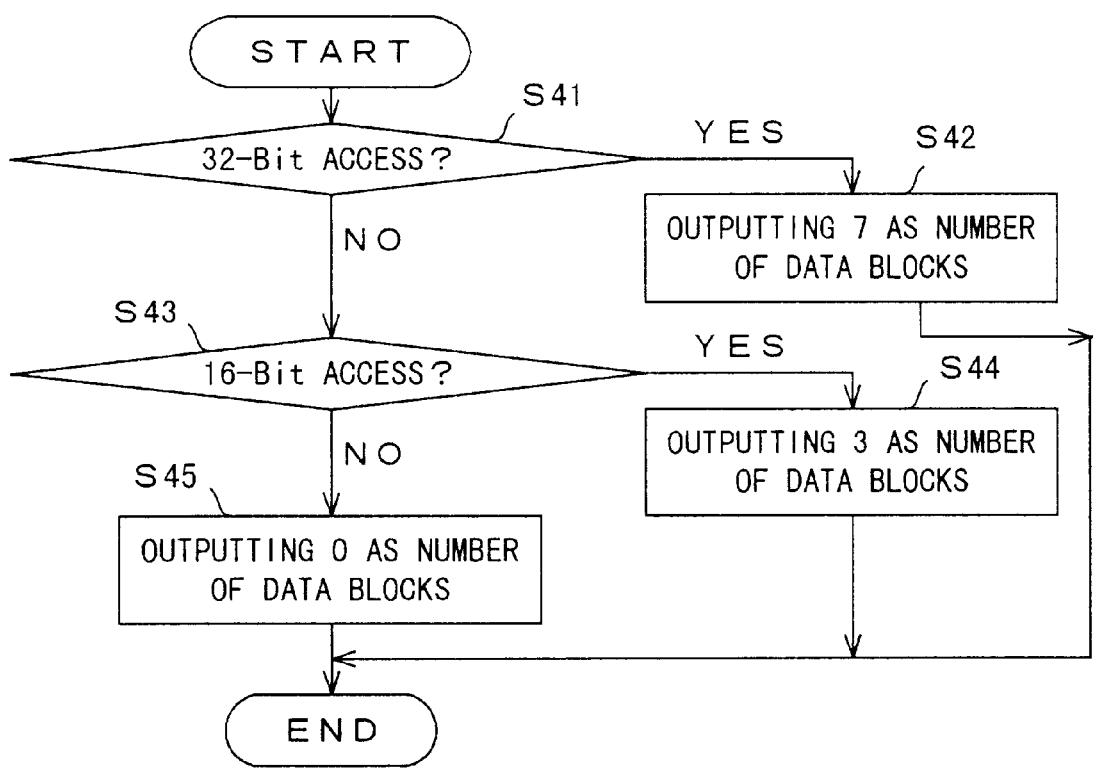
F I G. 14

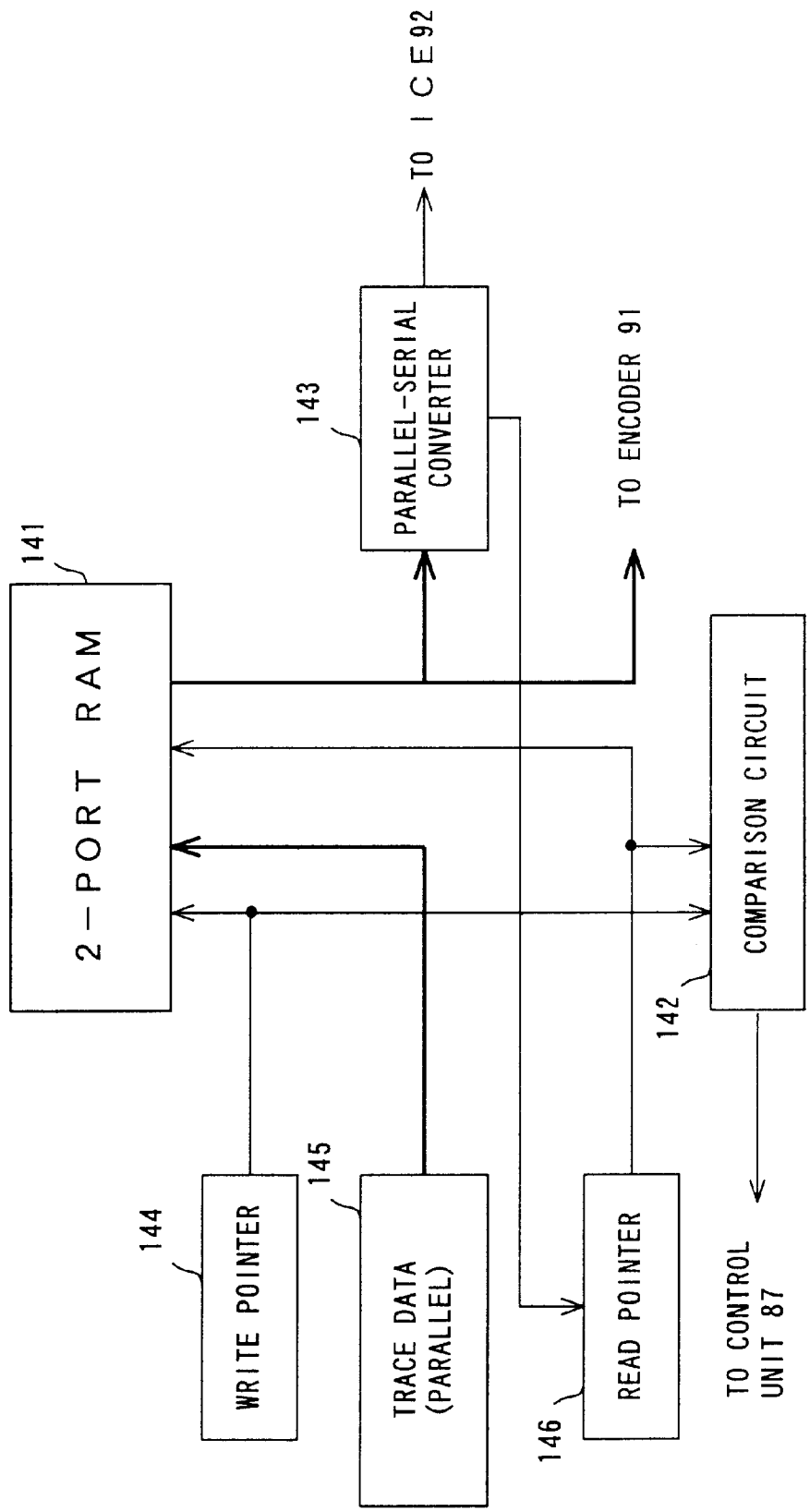
F I G. 15

|    | I   | II  | III | IV  | V   | VI  | VII |
|----|-----|-----|-----|-----|-----|-----|-----|
| IF | JMP | #0  | #1  |     |     |     |     |
| ID |     | JMP | X   | #1  |     |     |     |
| EX |     |     | JMP | X   | #1  |     |     |
| MA |     |     |     | JMP | X   | #1  |     |
| WB |     |     |     |     | JMP | X   | #1  |

→ PASSAGE OF TIME

FIG. 17A

|    | I | II | III | IV  | V | VI | VII | VIII |
|----|---|----|-----|-----|---|----|-----|------|
| MA |   |    |     | JMP | X | #1 |     |      |

↓          ↓

BRANCHED-FORM ADDRESS    BRANCHED-TO ADDRESS (DIFFERENCE ADDRESS) = (BRANCHED-FORM ADDRESS) − (BRANCHED-TO ADDRESS)

FIG. 17B

|    | I   | II  | III | IV  | V   | VI  | VII |
|----|-----|-----|-----|-----|-----|-----|-----|
| IF | JMP | X   | ST  |     |     |     |     |
| ID |     | JMP | X   | ST  |     |     |     |
| EX |     |     | JMP | X   | ST  |     |     |
| MA |     |     |     | JMP | X   | ST  |     |
| WB |     |     |     |     | JMP | X   | ST  |

↓

DIFFERENCE ADDRESS AND TRACE DATA GENERATION TIMING

FIG. 17C

INFORMATION PROCESSING APPARATUS

BACKGROUND OF THE INVENTION

1. Field of the Invention

The present invention relates to an information processing apparatus, and can be preferably applied to an interface unit with an in-circuit emulator (hereinafter referred to as an ICE) in a built-in type micro-controller.

2. Description of the Related Art

When an operation of the CPU is traced, it is necessary to externally output the trace data indicating the actual execution history.

On the other hand, for example, a RISC microcontroller provides an instruction bus and a data bus separately, and a bus width is designed for a larger number of bits so that the operations of the CPU can be performed at a higher speed.

It is hard to actually extend the width of a bus to output trace data based on the above described technology because of an increasing number of pins per package.

Therefore, when the bit width of an address and data used in a micro-controller is 8 or 16 bits for a low speed operation, all trace data can be easily output externally. However, when the bit width of an address and data used in a micro-controller is 32 or 64 bits for a high speed operation at 100 MHZ or more, it is hard to output all trace data externally.

To solve the above described problem, the following technology is applied to the conventional tracing device.

FIG. 1 is a block diagram of the configuration of the conventional tracing device.

In FIG. 1, 201 is a micro-controller, 202 is a CPU, 203 is a bus controller, 204 is a tracing module functioning as an interface circuit with an ICE 205, 205 is an ICE for receiving trace data which is an execution history of the micro-controller 201, and 206 indicates trace memory storing trace data.

211 is an instruction address bus used by the CPU 202 in fetching an instruction. 212 is a data address bus used by the CPU 202 in accessing data. 213 is a data bus used by the CPU 202 in accessing data. 214 is an external bus of the micro-controller 201. 215 is a trace bus for outputting an instruction execution status of the CPU 202 to the ICE 205. 216 is a status output bus for outputting a signal indicating the status of the data output from the trace bus 215. 217 is a signal line for outputting a wait signal for stopping the CPU 202 when the output of the trace data from the trace bus 215 is delayed.

Assuming that the bit width of the instruction address bus 211, the instruction address bus 212, the data bus 213, and the trace bus 215 is 32 bits, the tracing module 204 outputs only the instruction address output from the instruction address bus 211 to the ICE 205 through the trace bus 215, and the trace data of only the instruction address is output for each clock. In this case, data access information output from the data address bus 212 and the data bus 213 is not output to the ICE 205.

On the other hand, when there is a request to simultaneously trace data access information and an instruction address, the tracing module 204 outputs data access information and an instruction address to the trace bus 215. When instruction access and data access simultaneously arise, the tracing module 204 sets on the CPU 202 a wait for the end of the output of the trace data to prevent the trace data from being lost because the trace bus 215 does not have a sufficient bus width for both access.

FIG. 2 is a block diagram of another configuration of the conventional tracing device.

In FIG. 2, 221 is a micro-controller, 222 is a CPU, 223 is a bus controller, 224 is a debug support unit (hereinafter referred to as a DSU) functioning as an interface circuit with an ICE 225, 225 is an ICE, and 226 is trace memory storing trace data. 231 is an instruction address bus for use by the CPU 222 fetching an instruction, 232 is a data address bus for use by the CPU 222 accessing data, 233 is a data bus for use by the CPU 222 accessing data, 234 is an external bus of the micro-controller 221, 235 is a trace bus for outputting an instruction execution status of the CPU 222 to the ICE 225, 236 is a status output bus for outputting a signal indicating the status of the data output from the trace bus 235, and the internal status of the micro-controller 221, 237 is a signal line notifying the DSU 224 that the CPU 222 has executed the instruction and executed a branch instruction.

FIG. 3 is a block diagram of the configuration of the DSU 224 shown in FIG. 2.

In FIG. 3, 241 is a buffer for holding an instruction address output from the instruction address bus 231, 242 is a buffer for holding a data address output from the data address bus 232, 243 is a buffer holding the data output from the data bus 233, 244 is a switch for selecting the data output from among the buffers 241 through 243 to the trace bus 235, 245 is a buffer for holding the data selected by the switch 244, 246 is a parallel-serial converter for serially outputting the data held by the buffer 245 to the trace bus 235, 247 is a control circuit for controlling the switch 244 after determining the data output depending on the statuses of the buffers 241 through 243 and the status of the parallel-serial converter 246, and 248 is an address decoder for detecting the data write to a specific address.

With the configuration, the number of clocks required to output data is fixed in the DSU 224 depending on the type of the data output from the trace bus 235, and the output of data is not aborted in the middle of the outputting process.

In addition, since the bus width of the trace bus 235 is not sufficient when data access is traced, only the information about the data write to an assignment address of the buffer 243 specified by the user program is selected by the address decoder 248, and output to the trace bus 235.

Furthermore, the DSU 224 receives information from the CPU 222 about the execution of an instruction and a branch instruction performed by the CPU 222. Then, the DSU 224 outputs a branched-to address from the trace bus 235, and constantly outputs from the status output bus 236 a status for counting the number of execution instructions by the ICE 225. Upon receipt of the branched-to address and the number of execution instructions from the DSU 224, the ICE 225 computes the branched-from instruction address and the branched-to instruction address when a branch occurs, and restores the execution history of the user program.

When only instruction execution is traced in the tracing device shown in FIG. 1, no wait is set on the CPU 202. However, when not only instruction execution but also data access is simultaneously traced, a wait can be set on the CPU 202. Therefore, the speed of operations of the CPU 202 depends on whether or not a tracing process is performed. For example, if a motor is controlled using the micro-controller 201 or serial communications are established, the CPU 202 can normally perform a process when no tracing operation is performed, but the process speed of the CPU 202 cannot be sufficiently high when a tracing operation is performed.

In addition, in the tracing device shown in FIG. 2, when the micro-controller 221 is operated in real time, information overflows the buffers 241 through 243 if branches occur at intervals of the number of clocks required for one branch information outputting operation, or if a user performs several data writing operations within a short time at an address specified by the address decoder 248 for debugging. Therefore, the information overflowing the buffers 241 through 243 cannot be output to the ICE 225 side, whereby incurring the problem that instruction execution cannot be traced.

Furthermore, since trace data is serially output from the trace bus 235, there arises the problem that the band width of the trace bus 235 is not sufficient for tracing data access, and only the information about the data write can be output to an address of the buffer 243 assigned by the user program.

Additionally, the status information output from the status output bus 236 is generated in synchronization with the information of the signal line 237 connected to the CPU 202. Accordingly, there has been the problem that the number of execution instructions output from the status output bus 236 is output in asynchronization with a branched-to address output from the trace bus 235, and that the process of computing the branched-from instruction address and the branched-to instruction address on the ICE 225 side according to the above described information is complicated.

In addition, the built-in type micro-controller 221 has to perform a debugging process in the final program format even when an applied product is being developed. Therefore, the DSU 224 shown in FIG. 2 has the problem that an instruction code of data write for monitoring data is left in the final user program.

SUMMARY OF THE INVENTION

The present invention aims at providing an information processing apparatus capable of efficiently outputting trace data.

According to an aspect of the present invention, branch information is output after being inserted in an output sequence of data access information.

Thus, it is possible to commonly use an output bus for outputting data access information as an output bus for outputting branch information. Since it is not necessary to separately provide an output bus for outputting data access information and an output bus for outputting branch information, the size of the system can be reduced when a tracing operation is performed.

According to another aspect of the present invention, when a conflict between an output of branch information and an output of data access information is detected, the data access information is output after outputting the branch information.

Thus, even when branch information is inserted in an output sequence of data access information, it is possible to maintain the consistency in timing between branch information and data access information, thereby efficiently analyzing a tracing process.

According to a further aspect of the present invention, an instruction canceled by the generation of a branch is not output.

Thus, even when there arises a conflict between the output of branch information and the output of data access information, the information overflowing by the conflict can be received at the position where the instruction has been canceled, thereby reducing the load of the buffer for holding the overflowing information.

In addition, according to a further aspect of the present invention, the displacement of an address by the generation of a branch and the number of instruction executing operations from the generation of the branch to the generation of the next branch are computed, and only the number of significant digits of the address displacement and the number of instruction executing operations are output.

Thus, if the numbers of digits of the branched-from address and the branched-to address are large because the program is positioned around the end of the address space although the branched-from address and the branched-to address are not so separated, these pieces of information can be compressed, and the information can be output at a high speed.

According to a further aspect of the present invention, the number of significant digits can be contained in the branch information.

Thus, even if data in which the higher order bits of trace data are only 0 is not output, the branched-from address and the branched-to address can be restored. Therefore, the data in which the higher order bits of trace data are only 0 does not have to be output, thereby possibly compressing the trace data.

In addition, according to a further aspect of the present invention, a relative address and an absolute address are switched with each other and output based on the comparison between the number of significant digits of the relative address after a branch and the number of significant digits of the absolute address after a branch.

Thus, if the number of significant digits of a relative address becomes large because a branched-from address is separate from a branched-to address, then the relative address is not output as branch information, but the absolute address can be output as is as branch information, and the trace data can be efficiently analyzed in the ICE.

According to a further aspect of the present invention, only the numbers of significant digits of data address and access data can be output as data access information.

Thus, for example, when data is stored at an early stage in an address space, a redundant portion can be efficiently truncated and output, thereby outputting the information at a high speed.

According to a further aspect of the present invention, an absolute address is output at least once in a predetermined period.

Thus, a branch address chain can be traced from the point at which an absolute address is output in an instruction executing process. As a result, even when an address chain is broken during the process by losing data while a relative address is being output, the trace data can be analyzed from the point at which an absolute address is output, and the number of trace-back operations can be reduced when an absolute address is restored from a relative address, thereby easily generating a trace list.

According to a further aspect of the present invention, data read from an output timing adjusting buffer is output while being parallel-serial converted, and the decoding result of the data is simultaneously output as a status signal of a trace bus.

Thus, trace data and a signal indicating the status of the trace data can be synchronously output, thereby efficiently analyzing the trace data.

According to a further aspect of the present invention, in addition to a first output bus for use in parallel-serial converting and outputting trace data, a second output bus for use in outputting the trace data as parallel is provided. When the trace data is output through the second output bus, only an absolute address is output as branch information.

Thus, trace data can be output without being lost even when the trace data is not compressed.

According to a further aspect of the present invention, when branch information and data access information are output through the second output bus, system information other than the branch information and the data access information can be output through the first output bus.

Thus, trace data can be output without being lost, and the first output bus can be effectively used for use in outputting a status of a device, etc.

According to a further aspect of the present invention, when a buffer for adjusting an output timing becomes full, writing data to a buffer can be suspended after writing a data loss status to the buffer.

Thus, when data is lost, the data already written to a buffer before the data has been lost can be protected, and the position where the data has been lost can be confirmed, thereby efficiently tracing the data.

In addition, according to a further aspect of the present invention, writing data to a buffer after data has been lost is resumed at the occurrence of a branch, and an absolute address is written to a buffer as branch information.

Thus, a data chain can be traced from the starting point of resuming a data write, thereby preventing wasteful data from being written when the data write is resumed, thereby efficiently tracing data.

According to a further aspect of the present invention, a buffer is used as trace memory.

Thus, the amount of data equal to the capacity of a buffer can be prevented from being lost, thereby protecting the trace data and guaranteeing a debugging process on the trace data without a loss of data.

BRIEF DESCRIPTION OF THE DRAWINGS

The present invention will be more apparent from the following detailed description, when taken in conjunction with the accompanying drawings, in which:

FIG. 5 is a block diagram of the configuration of the information processing apparatus according to the second embodiment of the present invention

FIG. 9 is a flowchart of the operations of an instruction executing operation counter 23 shown in FIG. 8;

FIG. 13 is a flowchart of an example of an address block number computing process;

FIG. 14 is a flowchart of an example of a data block number computing process;

FIG. 15 is a block diagram of an example of the configuration of a FIFO 90 shown in FIG. 11;

FIG. 17A shows the operations of a pipe line 73 shown in FIG. 11;

FIG. 17B shows the method of generating a difference address at the execution of a branch instruction; and FIG. 17C shows the generation timing of trace data based on a difference address and data access by a branch.

DESCRIPTION OF THE PREFERRED EMBODIMENTS

The information processing apparatus according to an embodiment of the present invention is described by referring to the attached drawings.

Figure 1:
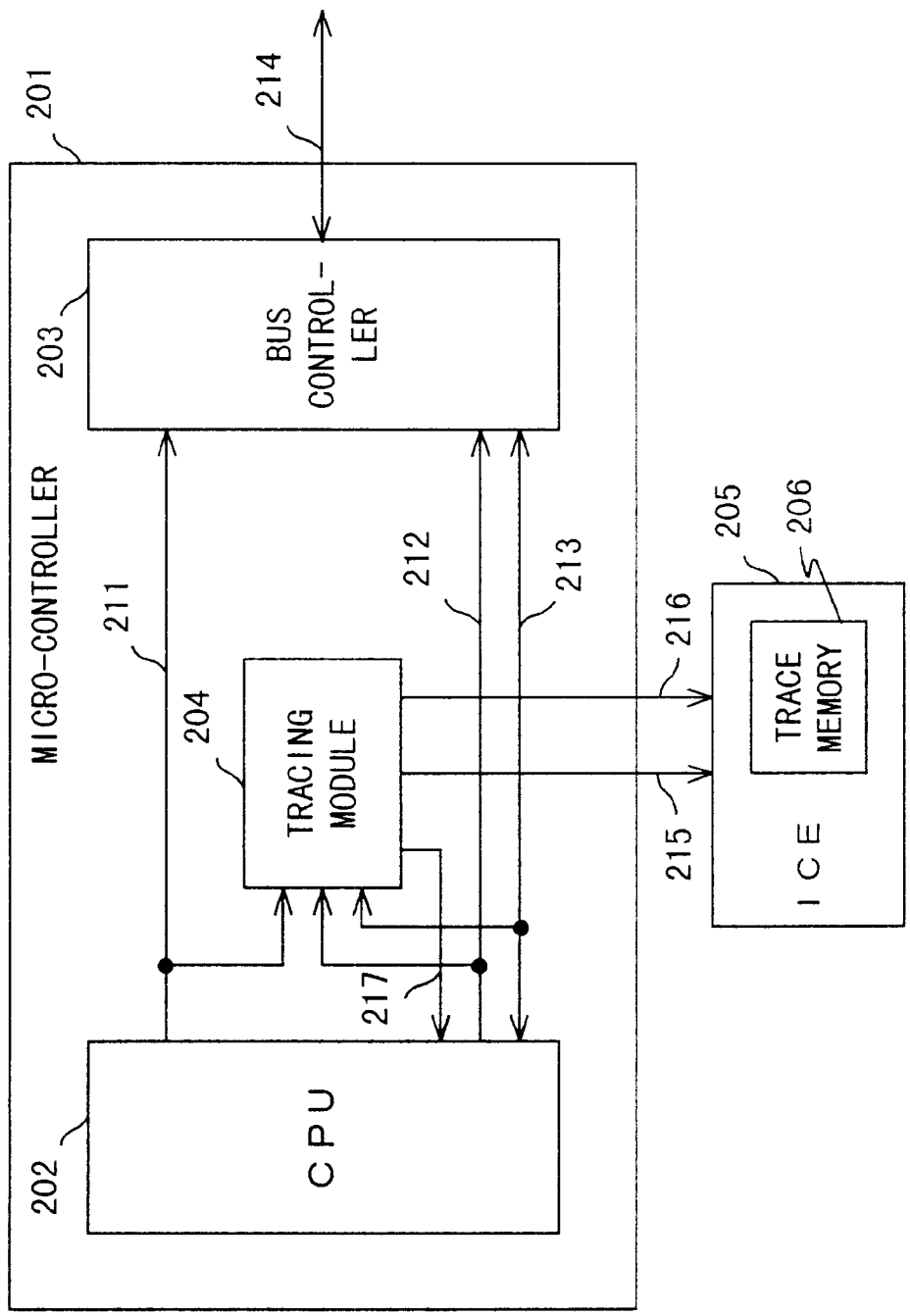
FIG. 1 is a block diagram of the configuration of the conventional tracing device.
Figure 2:
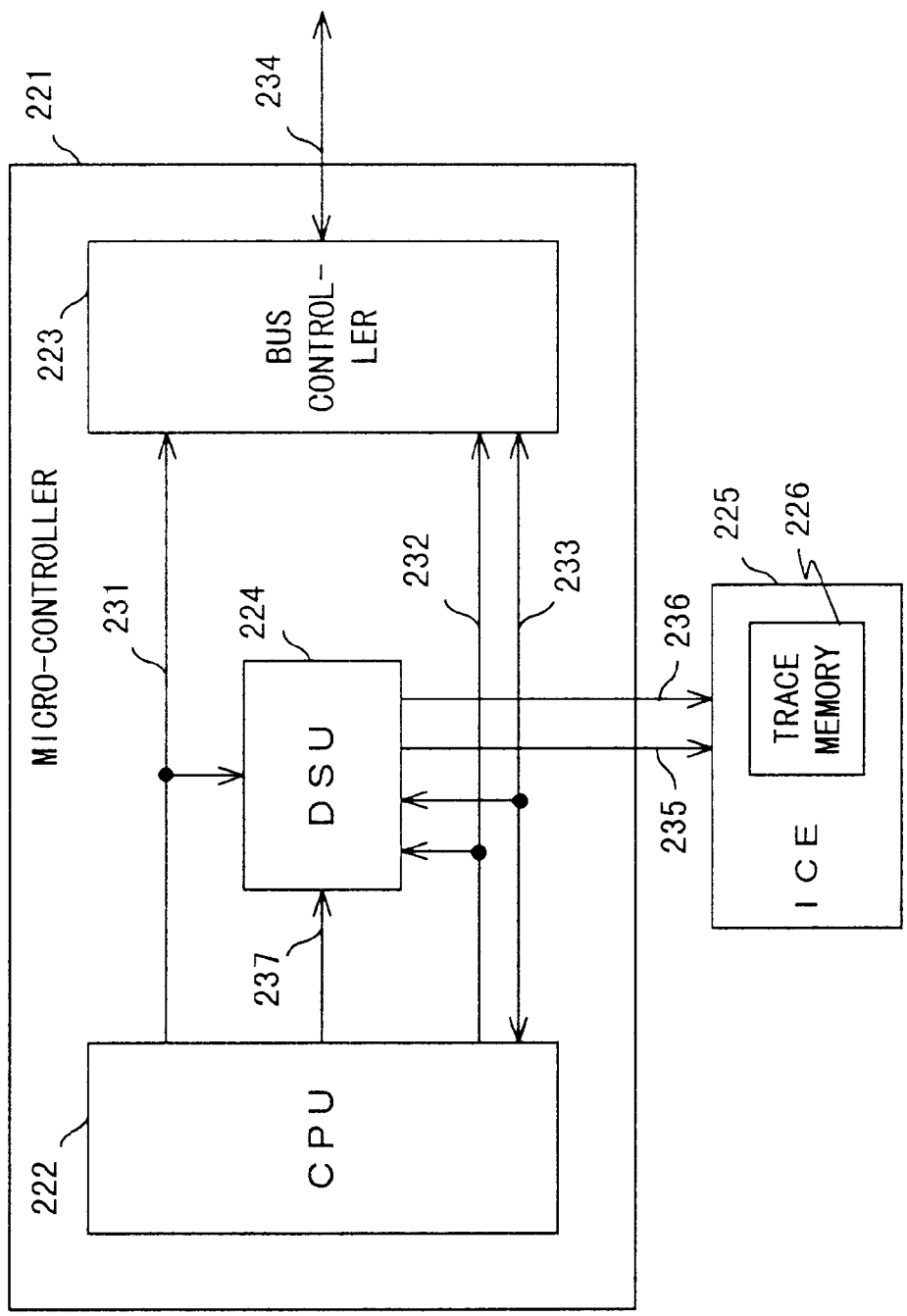
FIG. 2 is a block diagram of the configuration of the conventional tracing device.
Figure 3:
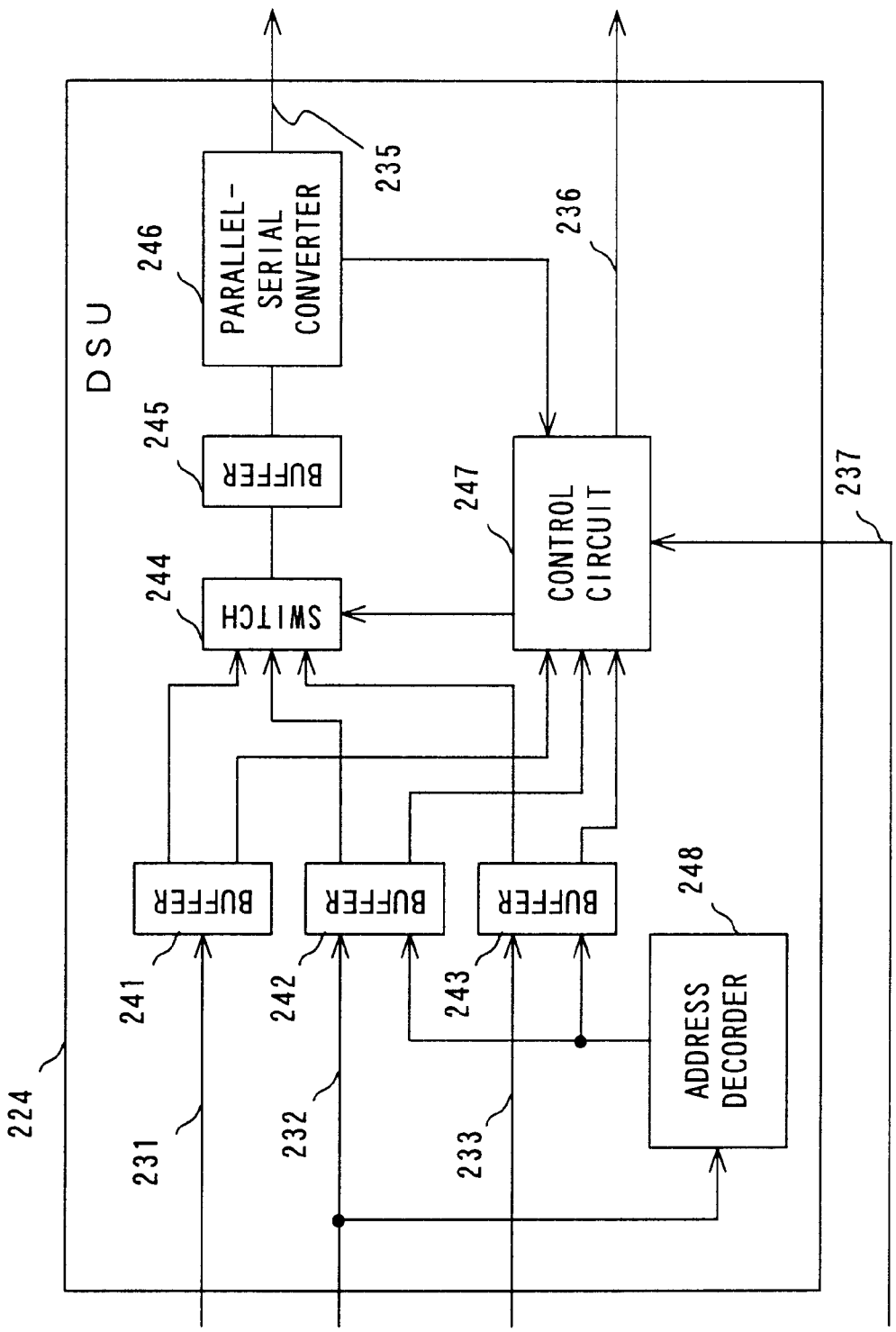
FIG. 3 is a block diagram of the configuration of the DSU 224 shown in FIG. 2.
Figure 4:
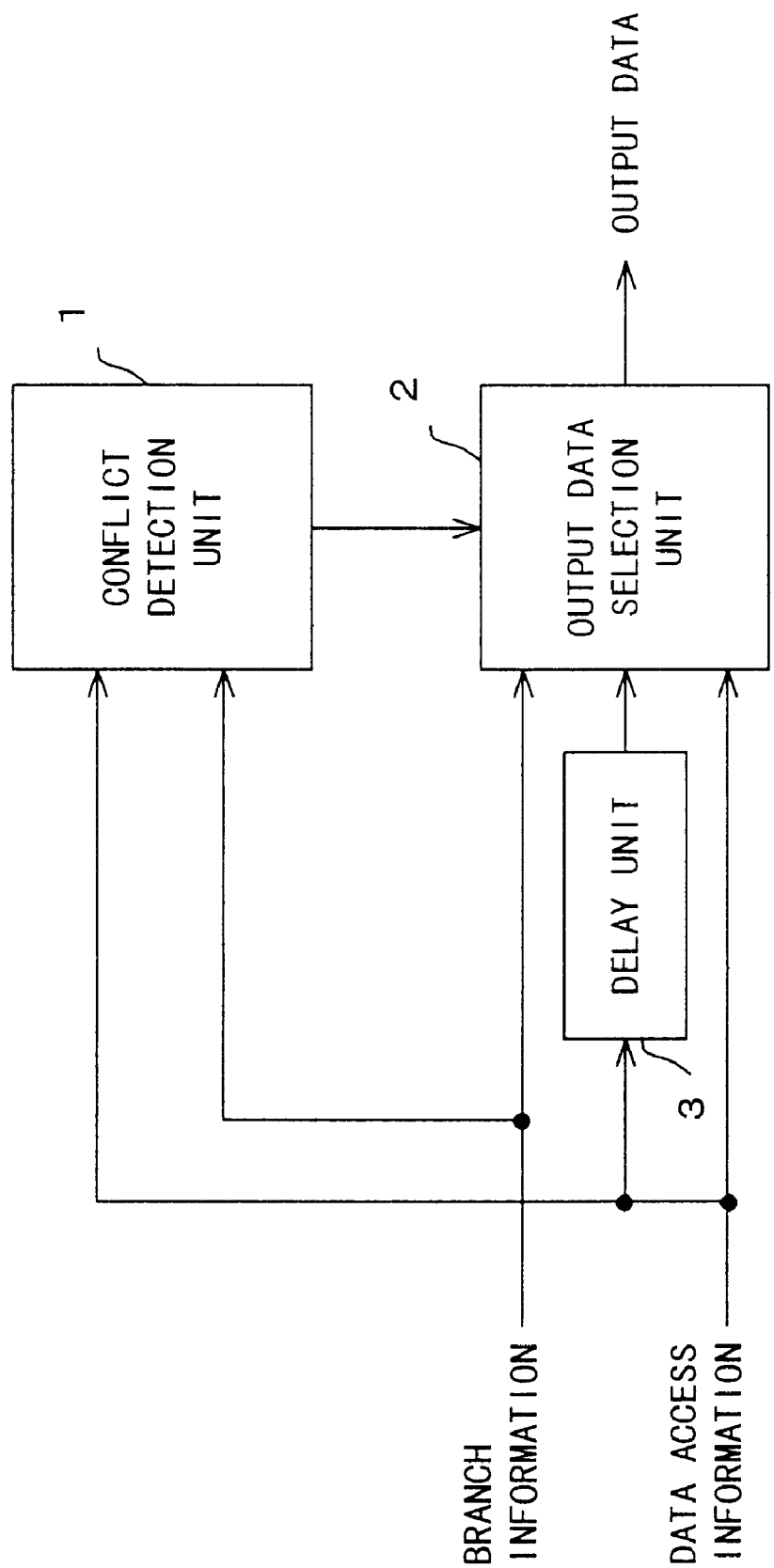
FIG. 4 is a block diagram of the configuration of the information processing apparatus according to the first embodiment of the present invention

FIG. 4 is a block diagram of the configuration of the information processing apparatus according to the first embodiment of the present invention.

In FIG. 4, a conflict detection unit 1 monitors an input of branch information and an input of data access information, and notifies an output data selection unit 2 when there arises a conflict between the input of the branch information and the input of the data access information.

Branch information and data access information are input to the output data selection unit 2. Also, the data access information delayed by a delay unit 3 is input to the output data selection unit 2. Then, the outputs of the branch information and the data access information are switched with each other according to an instruction from the conflict detection unit 1 so that the branch information and the data access information can be output through the same bus line.

Upon receipt of a notification from the conflict detection unit 1 that there arises a conflict between the input of branch information and the input of data access information, the output data selection unit 2 outputs the branch information, and then outputs the data access information delayed by the delay unit 3.

Thus, the branch information and the data access information can be output through a single bus line while maintaining the consistency in timing between the branch information and the data access information, thereby reducing the bit width required to output trace data, and also reducing the number of package pins.

Furthermore, when an instruction immediately after a branch instruction is canceled by the generation of a branch, the output data selection unit 2 can suppress the output of the instruction.

Thus, space can be generated in the output sequence of data, and the information overflowing by the conflict between the output of branch information and the output of data access information can be absorbed by the space, thereby reducing the load of a buffer for holding flowing information.

FIG. 5 is a block diagram of the configuration of the information processing apparatus according to the second embodiment of the present invention.

In FIG. 5, an address displacement computation unit 11 computes the displacement of an address by a branch. The displacement of an address can be obtained by computing {(branched-to address)−(branched-from address)}. An instruction executing operation number computation unit 12 computes the number of instruction executing operations from the generation of a branch to the generation of the next branch. A significant digit number computation unit 13 computes the number of significant digits of the displacement of an address and the number of significant digits of the number of instruction executing operations, and outputs the computation result to a data output unit 14. The data output unit 14 retrieves only the portion of significant digits from the displacement of an address received from the address displacement computation unit 11, and retrieves only the portion of significant digits from the number of instruction executing operations received from the instruction executing operation number computation unit 12. Then, it outputs the portion corresponding to the significant digits of the displacement of the address and the number of instruction executing operations as branch information.

At this time, if an instruction address is input as branch information, the information required to trace an executed instruction is a branched-from instruction address and a branched-to instruction address when a branch occurs. A branched-from address can be obtained based on the number of instruction executing operations performed after a branch occurs until the next branch arises. The branched-to instruction address can be obtained by the displacement of an address from the branched-from instruction address to the branched-to instruction address.

Accordingly, the displacement of an address and the number of instruction executing operations are obtained and the obtained data is output as branch information, thereby possibly tracing an executed information. Starting a program is regarded as a branch.

Figure 6:
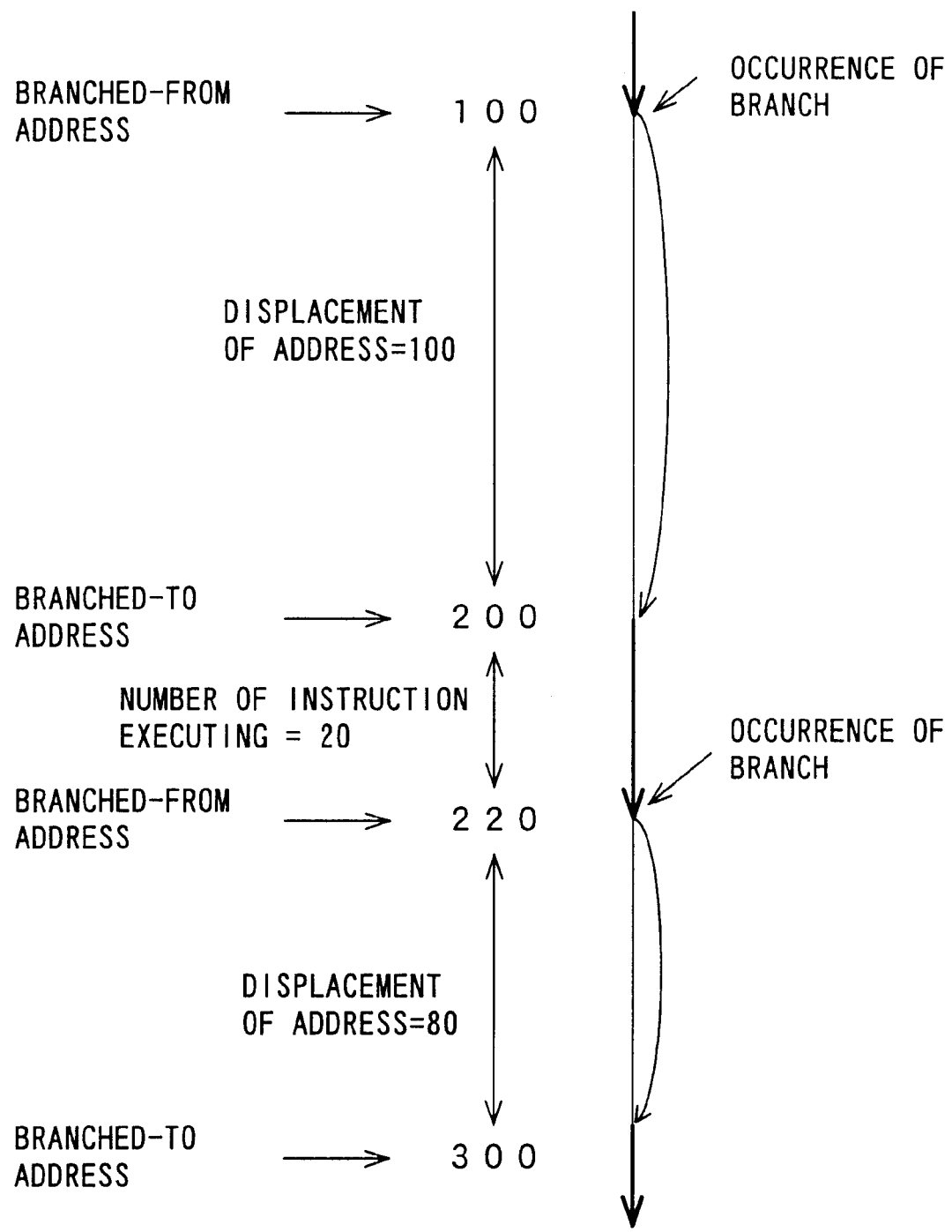
FIG. 6 shows the method of computing the displacement of an address and the number of instruction executing operations shown in FIG. 5.

FIG. 6 shows the method of computing the displacement of an address and the number of instruction executing operations shown in FIG. 5.

In FIG. 6, a branch occurs at the position of a branch-from address '100'. An instruction is executed by jumping to the position of a branch-to address '200'. Another branch occurs again at the position of a branch-from address '220'. Then control jumps to the position of a branch-to address '300'. In this case, the displacement of an address from the branch-from address '100' to the branch-to address '200' is 100, the number of instruction executing operations from the occurrence of the first branch to the occurrence of the next branch is 20, and the displacement of an address from the branch-from address '220' to the branch-to address '300' is 80. Therefore, according to the displacement of an address and the number of instruction executing operations, the branched-from address and the branched-to address can be computed.

In this operation, the displacement of an address and the number of instruction executing operations are computed to remove redundant portions from the branched-from instruction address and the branched-to instruction address. For example, in a normal program, it is common to set a loop having the number of significant digits of the displacement of an address equal to or smaller than 10 bits. In this case, for example, if an instruction address having a 32-bit width is output as is, then the output data contains a number of redundant portions, and many bits are wasteful, thereby deteriorating the utilization of a trace bus.

Then, the utilization of a trace bus is improved by outputting the displacement of an address and the number of instruction executing operations as branch information.

Figure 7:
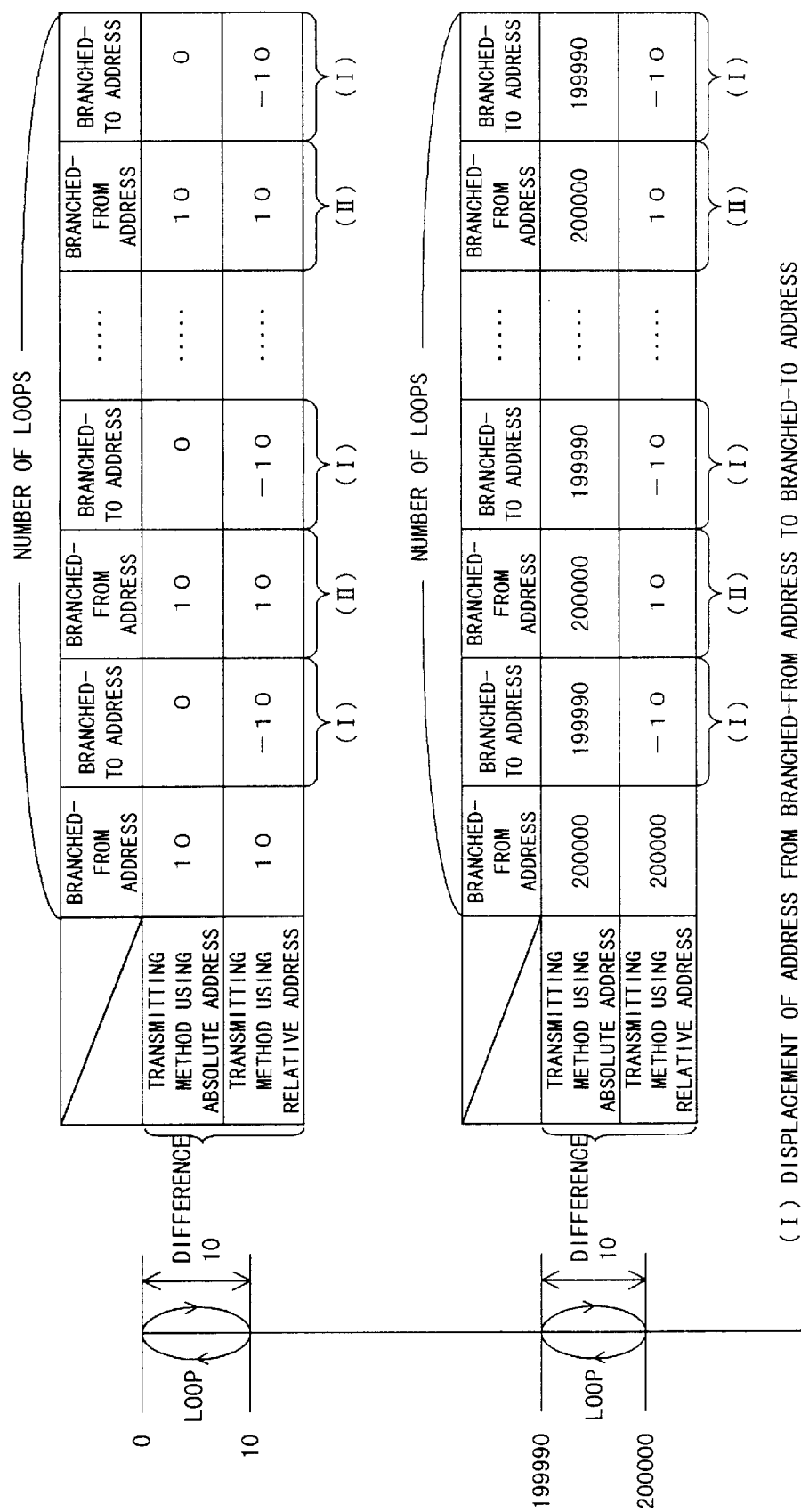
FIG. 7 shows an example of output data from the information processing apparatus shown in FIG. 5.

FIG. 7 shows an example of output data of the information processing apparatus.

In FIG. 7, it is assumed that a loop is set between the addresses '0' and '10' in an address space, and a loop is set between the addresses '199990' and '200000'. In this case, the difference of addresses is 10 in any loop. However, if the execution result of the loop at the addresses '0' through '10' is transmitted using an absolute address, then the address width can be expressed by two digits (when binary numbers are used). On the other hand, if the execution result of the loop at the addresses '199990' through '200000' is transmitted using an absolute address, then the address width can be expressed by six digits ((when binary numbers are used).

That is, when a loop is positioned behind the address space, there arise more redundant portions between the branched-from address and the branched-to address. If the data is output as is, the utilization of trace bus is deteriorated. Specifically, depending on the number of repetitions of a loop, the redundant data is output many times, thereby reducing the efficiency.

The displacement (I) of an address from the branched-from address to the branched-to address and the number (II) of instruction executing operations between branches are computed for the loop between the addresses '199990' and '200000'. The branched-to address and the branched-from address are not output as is, but the minimal information for the restoration of the addresses, that is, the displacement of an address and the number of instruction executing operations are output, and simultaneously output is the tag information indicating how many bits of the displacement of an address and the number of instruction executing operations are significant from the lowest order bit.

Thus, the data width required to output the execution result of the loop at the position between the addresses '199990' and '200000' can be only 2 digits (excluding signs when binary numbers are used), thereby efficiently utilizing a trace bus.

Figure 8:
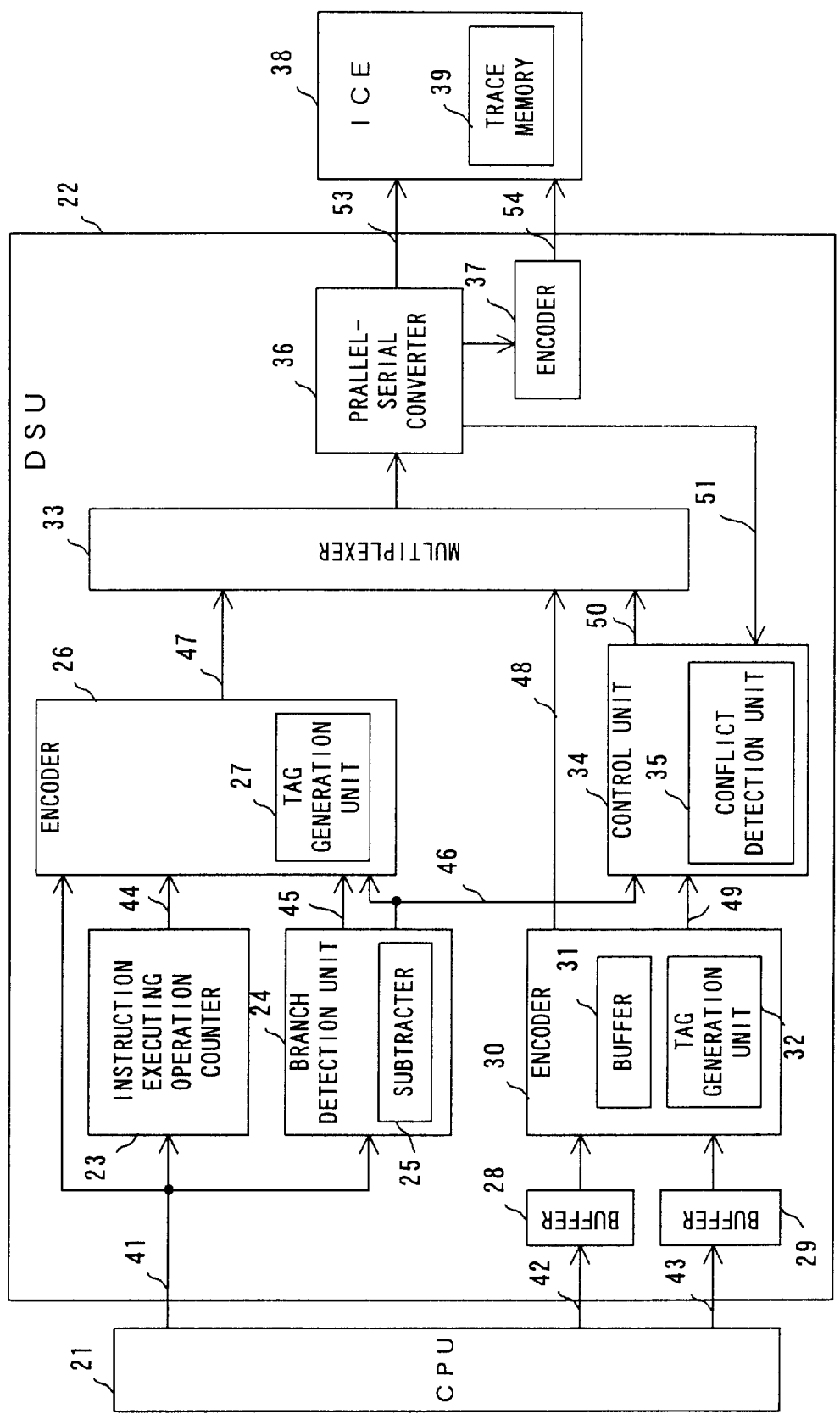
FIG. 8 is a block diagram of the configuration of the information processing apparatus according to the third embodiment of the present invention.

FIG. 8 is a block diagram of the configuration of the information processing apparatus according to the third embodiment of the present invention.

In FIG. 8, 21 is a CPU, 22 is a DSU, 23 is an instruction executing operation counter obtaining the number of instructions executed between branches, 24 is a branch detection unit for detecting the occurrence of a branch from the difference between the instruction addresses output by the CPU 21, 25 is a subtracter for obtaining the difference between instruction addresses, 26 is an encoder for generating data required to output trace data from the data output of the instruction executing operation counter 23 and the branch detection unit 24 when a branch occurs, 27 is a tag generation unit for computing the number of significant digits of the output data of the instruction executing operation counter 23 and the branch detection unit 24, 28 is a buffer for setting a timing of data transmitted through the data address bus 42, 29 is a buffer for setting a timing of data transmitted through the data bus 43, 30 is an encoder for generating trace data from the data access information held by the buffers 28 and 29, 31 is a buffer for delaying data access information, 32 is a tag generation unit for computing the number of significant digits of data access information, 33 is a multiplexer for switching the outputs between the branch information output from the encoder 26 and the data access information output from the encoder 30 at an instruction from a control unit 34, 34 is a control unit for notifying the multiplexer 33 of the data output to a trace bus 53 according to the occurrence of a branch and the status of data access, 35 is a conflict detection unit for detecting an occurrence of a branch and a conflict for data access, 36 is a parallel-serial converter, including a FIFO (first-in first-out memory), for adjusting a timing of trace data occurring non-periodically, 37 is an encoder for outputting a status signal indicating the type of trace data output from the parallel-serial converter 36, 38 is an ICE, and 39 is a trace memory in the ICE 38.

In addition, 41 is a instruction address bus for use by the CPU 21 fetching an instruction, 42 is a data address bus for use by the CPU 21 accessing data, 43 is a data bus for use by the CPU 21 accessing data, 44 is a signal line outputting the number of instruction executing operations to the encoder 26, 45 is a signal line outputting the displacement of an address to the encoder 26, 46 is a signal line notifying the encoder 26 and the control unit 34 of the occurrence of a branch, 47 is a signal line outputting branch information generated by the encoder 26 to the multiplexer 33, 48 is a signal line outputting data access information generated by the encoder 30 to the multiplexer 33, 49 is a signal line notifying the control unit 34 of the occurrence of data access, 50 is a signal line outputting an switch instruction of the multiplexer 33, 51 is a signal line notifying FIFO memory whether or not there is a blank entry, 52 is a signal line outputting trace data from the multiplexer 33, 53 is a trace bus outputting trace data to the ICE 38, and 54 is a status output bus notifying the ICE 38 of the status of the data being output to the trace bus 53.

Described below are the operations of the DSU 22 shown in Fig.8.

When the CPU 21 executes an instruction, the instruction address of the executed instruction is output to the instruction executing operation counter 23 and the branch detection unit 24 through the instruction address bus 41. The instruction executing operation counter 23 computes the number of instructions executed by the CPU 21 by counting the number of input instruction addresses.

FIG. 9 is a flowchart of the operations of the instruction executing operation counter 23 shown in FIG. 8.

In FIG. 9, the instruction executing operation counter 23 resets the instruction executing operation counter 23 (step S2) when a branch occurs (step S1), and increments the contents of the instruction executing operation counter 23 (step S4) each time the CPU 21 executes an instruction (step S3) when no branches occur (step S1).

The branch detection unit 24 computes the displacement of an address of an instruction address by computing the difference between the currently input instruction address and the instruction address input immediately before it. Then, the branch detection unit 24 detects from the displacement of an address whether or not a branch has occurred during the execution of an instruction by the CPU 21. When the branch detection unit 24 detects the occurrence of a branch, it notifies the encoder 26 and the control unit 34 of the occurrence of the branch, and resets the instruction executing operation counter 23.

Upon receipt of a notification of the occurrence of a branch, the encoder 26 computes the number of significant bits of the displacement of an address output from the branch detection unit 24. The number of significant bits can be obtained from the position where the first non-zero bit appears when transmitted data is viewed from the highest order bit.

Then the number of significant bits of the displacement of an address is obtained, the encoder 26 generates branch information by adding the number of significant bits to the displacement of an address as tag data. Then, the value obtained by adding the number of bits of the tag data to the number of significant bits of the displacement of an address is compared with the bit width of an instruction address.

If the value obtained by adding the number of bits of the tag data to the number of significant bits of the displacement of an address is equal to or larger than the bit width of an instruction address, then the branched-to absolute address input from the instruction address bus 41 is output to the multiplexer 33 as is.

On the other hand, if the value obtained by adding the number of bits of the tag data to the number of significant bits of the displacement of an address is smaller than the bit width of an instruction address, then the value obtained by adding the tag data to the displacement of an address is output to the multiplexer 33.

For example, assuming that the bit width of the instruction address is 32 bits and the number of bits of the tag data is 5 bits, the encoder 26 outputs the branched-to absolute address output from the instruction address bus 41 as is when the number of significant bits of the displacement of an address is equal to or larger than 27 bits. When the number of significant bits of the displacement of an address is smaller than 27 bits, the value obtained by adding the tag data to the displacement of an address is output. That is, when control jumps from one end to the other end of an address space, the number of significant bits of the displacement of an address becomes large, and an absolute address is output as is. If small loops are repeated, the number of significant bits becomes small, and a relative address is output.

In addition, upon receipt of a notification of an occurrence of a branch, the encoder 26 computes the number of significant bits about the number of instruction executing operations output from the instruction executing operation counter 23. When the number of significant bits is obtained, the branch information is generated by adding the number of significant bits as tag data to the number of instruction executing operations, and is output to the multiplexer 33.

Regardless of the number of significant bits of the displacement of an address and the number of instruction executing operations, the encoder 26 outputs an absolute address to the multiplexer 33 at least once in a predetermined period. For example, an absolute address is output to the multiplexer 33 at least once in several thousand clocks so that trace data can be easily analyzed on the ICE 38 side. That is, if only absolute addresses are output, it is necessary to trace back a trace list to the beginning when the trace list is analyzed, thereby taking a considerable time in analyzing the trace list. On the other hand, if an absolute address is necessarily output once in several thousand clocks, it is only necessary to trace back a trace list by several thousand clocks at most, thereby efficiently analyzing the trace list. Furthermore, if only relative addresses are output, and data is lost during the process, then the subsequent analysis of trace data is disabled. However, when an absolute address is output, the trace data can be analyzed therefrom.

On the other hand, if data access occurs during the operation of the CPU 21, the data address output to the data address bus 42 is input to the encoder 30 through the buffer 28, and the access data output to the data bus 43 is input to the encoder 30 through the buffer 29.

When the data address and the access data are input, the encoder 30 notifies the control unit 34 of the occurrence of the data access, and obtains the number of significant bits of the data address and the access data. Then, it generates data access information by adding the obtained number of significant bits as tag data to the data address and the access data, and outputs the generated data access information to the multiplexer 33. In addition, the encoder 30 stores the generated data access information in the buffer 31, adds it to the current data access information, and outputs also the delayed data access information to the multiplexer 33.

The control unit 34 monitors the occurrence of a branch notified by the branch detection unit 24, and the multiplexer 33 is notified of the occurrence of data access.

Figure 10:
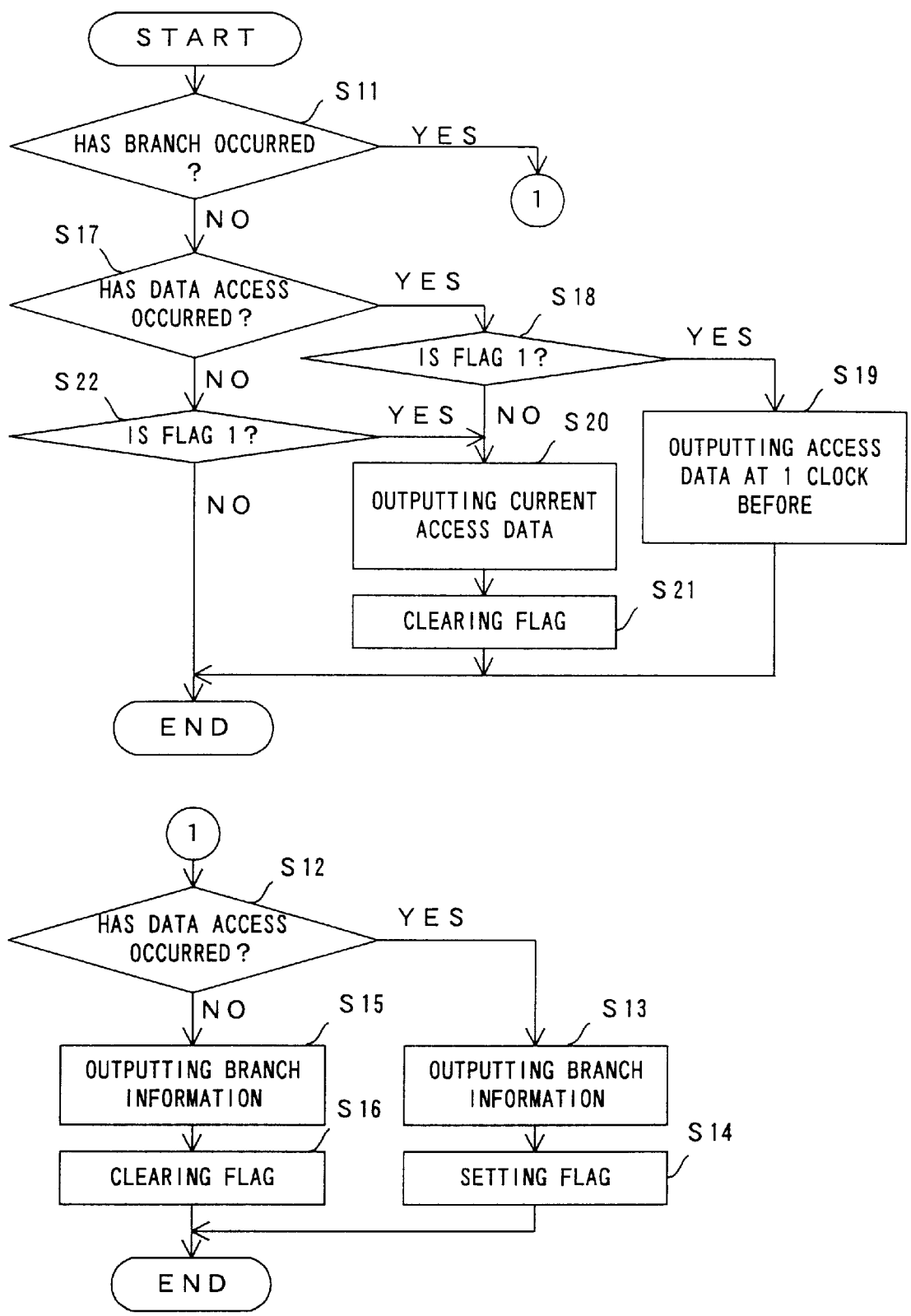
FIG. 10 is a flowchart of the operations of a control unit 34 shown in FIG. 8.

FIG. 10 is a flowchart of the operations of the control unit 34 shown in FIG. 8.

In FIG. 10, the control unit 34 determines whether or not data access has been tried when a branch has occurred (step S11), issues an instruction to output branch information to the multiplexer 33 (step S13) if data access has been tried (step S12), and sets a flag to 1 (step S14). In this case, the access data generated in step S12 is held by the buffer 31.

On the other hand, if it is determined that data access has not been tried (step S12), an instruction to output branch information is issued to the multiplexer 33 (step S15), and clears the flag to 0 (step S16).

On the other hand, if it is determined in step S11 that no branches have occurred, then it is determined (step S17) whether or not data access has been tried, and it is determined whether or not the flag has been set to 1 (step S18) when data access is tried. If the flag is set to 1, then an instruction to output access data at one clock before is issued to the multiplexer 33 (step S19). If the flag is not set to 1, then an instruction to output the current access data is issued to the multiplexer 33 (step S20), and the flag is cleared to 0 (step S21).

If it is determined that data access has not been tried in step S17, then it is determined whether or not the flag is set to 1 (step S22). If the flag is set to 1, an instruction to output the current access data is issued to the multiplexer 33 (step S20), and the flag is cleared to 0 (step S21). If it is determined that the flag is not set to 1 in step S22, then the process terminates.

When the branch information from the encoder 26 or the data access information from the encoder 30 is input, the multiplexer 33 outputs the information to the parallel-serial converter 36 through the signal line 52. If the multiplexer 33 is notified of the conflict between the occurrence of a branch and the occurrence of data access by the control unit 34, then it selects the branch information from the encoder 26, outputs it to the signal line 52, and then selects the delayed data access information from the encoder 30 and outputs it to the signal line 52.

As a result, the branch information and the data access information containing the number of significant bits are transmitted to the parallelserial converter 36 as arranged in time series.

When parallel-serial converter 36 receives the branch information and the data access information transmitted through the signal line 52, the parallel-serial converter 36 stores them as is in the FIFO memory contained in the parallel-serial converter 36. Then, it reads the branch information and the data access information from the FIFO memory while adjusting the output timing of the branch information and the data access information, converts the branch information and the data access information into serial data, and outputs them to the ICE 38 through the trace bus 53. When the branch information and the data access information are read from the FIFO memory, the numbers of significant bits contained in the branch information and the data access information are retrieved, and the parallel-serial conversion is performed while discarding the data other than the data indicated by the numbers of the significant bits.

In addition, the parallel-serial converter 36 transmits the data to be processed in the parallelserial conversion to the encoder 37, and encodes the data status output to the trace bus 53. While the parallel-serial converted data is being output to the trace bus 53, the status signal encoded by the encoder 37 is output to the ICE 38 through the status output bus 54.

Assuming that each of the instruction address bus 41, the data address bus 42, and the data bus 43 has a 32-bit width, the signal line 52 from the multiplexer 33 has a 64-bit width, and the trace bus 53 has a 4-bit width, the multiplexer 33 transmits the branch information and the data access information input through the instruction address bus 41, the data address bus 42, and the data bus 43 to the parallel-serial converter 36 in 64-bit parallel. The parallel-serial converter 36 converts the 64-bit parallel data transmitted from the multiplexer 33 into 4-bit parallel data, and output the converted data to the ICE 38. At this time, the parallel-serial converter 36 discards the redundant portions contained in the 64-bit parallel data received from the multiplexer 33, and outputs the resultant data to the ICE 38.

Therefore, when the trace data is parallel-serial converted and output to the ICE 38, the number of clocks required to output the trace data can be reduced, thereby avoiding the loss of the trace data.

In addition, the DSU 22 shown in FIG. 8 defines a protocol for the restoration to be performed in case the output of the trace data is delayed.

For example, if a branch and data access frequently occur, a timing-adjusting buffer becomes full, and the output of trace data is delayed, then the parallel-serial converter 36 notifies the control unit 34 that the buffer is full. Upon receipt of the notification of the full buffer, the control unit 34 writes a data loss status at the end of the buffer, and suspends the output of trace data to the buffer.

Thus, the trace data stored before the buffer has become full can be protected, the output of the trace data stored before the buffer has become full can be guaranteed, and the point at which data has been lost can be easily located.

When a process of writing trace data to a buffer is resumed, it is started from the occurrence of a branch when the buffer has a space again, and branch information is to be written at an absolute address when data is output again.

Thus, it becomes possible to trace a data chain immediately after starting outputting trace data again after data has been lost, thereby efficiently analyzing the trace data.

As described above, according to the embodiment shown in FIG. 8, the branch information from the encoder 26 and the data access information from the encoder 30 are switched with each other, and output to the common signal line 52. As a result, the number of signal lines required to output trace data can be reduced.

In addition, when the encoder 26 outputs the number of instruction executing operations and the displacement of an address as branch information, data can be efficiently compressed when branch is made for a short distance. Accordingly, although a small loop is executed and branches are continuously repeated in a short period, it is possible to reduce the number of clocks required to output branch information at a time, thereby avoiding the loss of trace information.

If there arises a conflict between a branch and data access, the encoder 26 outputs branch information, and then outputs data access information, thereby maintaining the consistency in timing between the branch information and the data access information, and avoiding the struggle for output between the branch information and the data access information.

In addition, if the encoder 26 transmits trace data with tag information added to the data to the parallel-serial converter 36, and discards redundant data when the data is parallel-serial converted, then the trace data output from the trace bus 53 can be synchronized with the status signal output from the status output bus 54. As a result, the output data can be easily analyzed, and a large volume of information can be transmitted through the status output bus 54, thereby successfully specifying a complicated format for output data.

Figure 11:
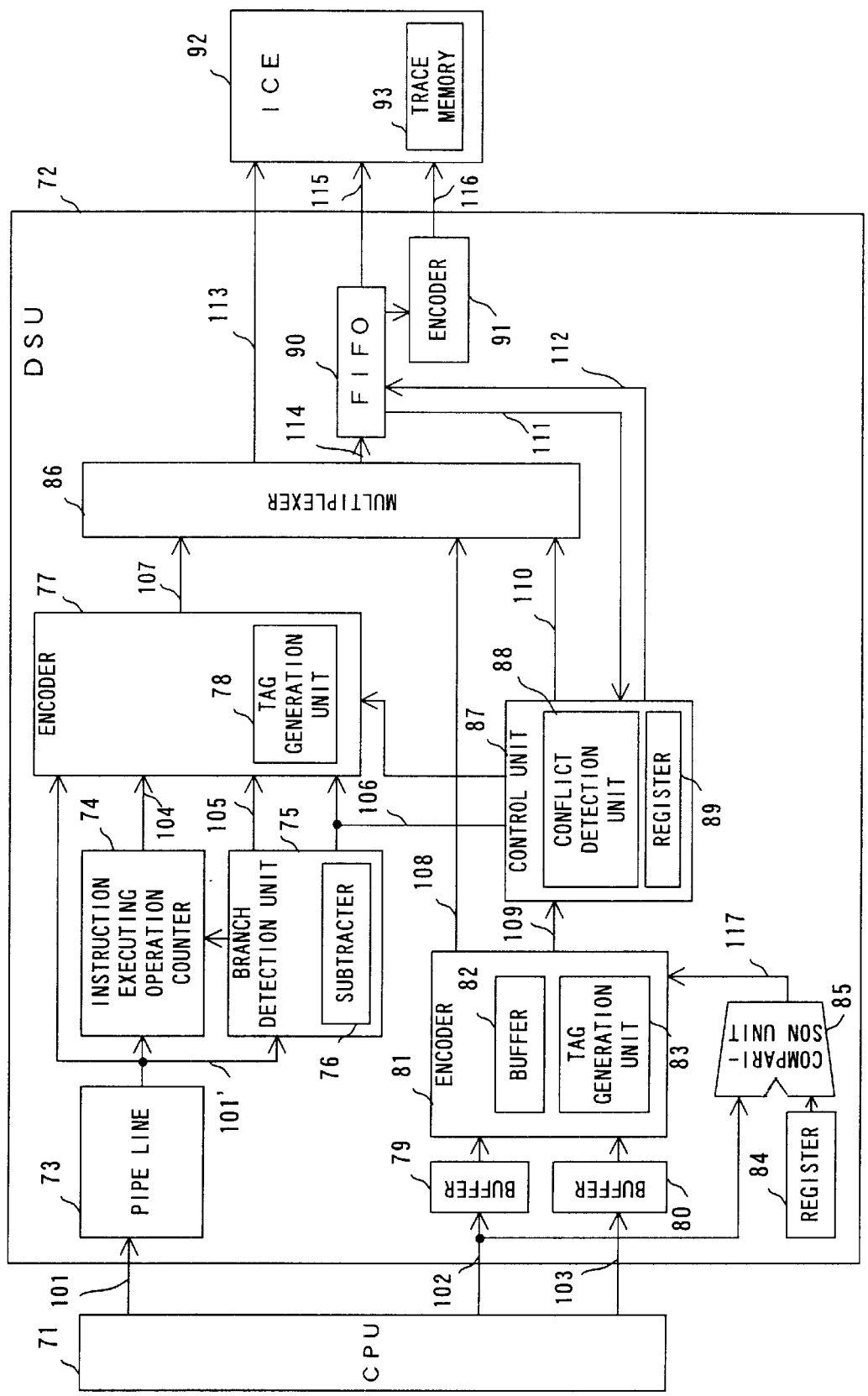
FIG. 11 is a block diagram of the configuration of the information processing apparatus according to the fourth embodiment of the present invention.

FIG. 11 is a block diagram of the configuration of the information processing apparatus according to the fourth embodiment of the present invention.

In FIG. 11, 71 is a CPU, 72 is a DSU, 73 is an address pipe line for retrieving only an address of an instruction actually executed from the data in the instruction address bus 101, 74 is an instruction executing operation counter for obtaining the number of instructions executed between each branch, 75 is a branch detection unit for detecting the occurrence of a branch from the difference between instruction addresses output by the CPU 71, 76 is a subtracter for obtaining the difference between instruction addresses, 77 is an encoder for generating data required to output trace data from the output data of the instruction executing operation counter 74 and the branch detection unit 75 when a branch occurs, 78 is a tag generation unit for computing the number of significant digits of the output data from the instruction executing operation counter 74 and the branch detection unit 75, 79 is a buffer for timing data of the data address bus 102, 80 is a buffer for timing data of the data bus 103, 81 is an encoder for generating trace data from data access information stored in the buffers 79 and 80, 82 is a buffer for use in delaying data access information, 83 is a tag generation unit for computing the number of significant digits of data access information, 84 is a register specifying data address to be traced, 85 is a comparison unit for comparing the data address specified by the register 84 with the data address output from the data address bus 102, 86 is a multiplexer for selecting either the branch information output by the encoder 77 or the data access information output from the encoder 81 according to an instruction from a control unit 87, 87 is a control unit 87 for instructing a switch between a trace bus 113 and a trace bus 115, and instructing the multiplexer 86 to output data to the trace bus 115 based on the occurrence of a branch and the state of data access, 88 is a conflict detection unit for detecting the conflict between the occurrence of a branch and data access, 89 is a register for setting FIFO 90 as a timing adjusting buffer or as trace memory, 90 is FIFO for absorbing the uneven timing of generating trace data, 91 is an encoder for generating a status signal indicating the type of data output from the FIFO 90, 92 is an ICE, and 93 is trace memory.

101 is an instruction address bus for use by the CPU 71 fetching an instruction, 102 is a data address bus for use by the CPU 71 accessing data, 103 is a data bus 103 for use by the CPU 71 accessing data, 101' is a signal line for outputting address information output from the pipe line 73, 104 is a signal line for outputting the number of instruction executing operations to the encoder 77, 105 is a signal line for outputting the displacement of an address to the encoder 77, 106 is a signal line for notifying the encoder 77 and the control unit 87 of the occurrence of a branch, 107 is a signal line for outputting the branch information generated by the encoder 77 to the multiplexer 86, 108 is a signal line for outputting the data access information generated by the encoder 81 to the multiplexer 86, 109 is a signal line for notifying the control unit 87 of the occurrence of data access, 110 is a signal line for instructing a switch of the multiplexer 86, 111 is a signal line for notifying whether or not there is a blank entry in a 2-port RAM 141 provided in the FIFO 90, 112 is a signal line for instructing whether the FIFO 90 is used as a timing adjusting buffer or as trace memory, 113 is a trace bus for outputting trace data to the ICE 92 in parallel, 115 is a trace bus for outputting parallel-serial converted trace data to the ICE 92, 116 is a status output bus 116 for notifying the ICE 92 of the status of the data being output to the trace bus 115.

With the configuration, the trace bus 113 outputs a data address, data, data size, and read/write signal in parallel. For example, assuming that the data address and the data have a 32-bit width, the bit width of the trace bus 113 is approximately 70 bits.

Described below are the operations of the DSU 72 shown in FIG. 11.

When the CPU 71 fetches an instruction, its instruction address is transmitted to the pipe line 73 through the instruction address bus 101. The pipe line 73 performs the same processes as the pipe line operations performed by the CPU 71, retrieves only the addresses of the instructions actually executed from the data of the instruction address bus 101, and outputs the result to the instruction executing operation counter 74 and the branch detection unit 75. When address information is output from the pipe line 73, the instruction executing operation counter 74 computes the number of instruction executing operations actually performed by the CPU 71. The branch detection unit 75 detects whether or not a branch has occurred while the CPU 71 is executing an instruction by computing the displacement of an instruction address. If the branch detection unit 75 detects the occurrence of a branch, it notifies the encoder 77 and the control unit 87 of the occurrence of the branch, and resets the instruction executing operation counter 74.

The control unit 87 sets whether trace data is to be transmitted through the trace bus 115 or the trace bus 113. If trace data is to be transmitted through the trace bus 113, the control unit 87 instructs the encoder 77 to output only an absolute address as branch information. In addition, the control unit 87 instructs the multiplexer 86 to output trace data through the trace bus 113, and instructs the multiplexer 86 to output system information other than a branch and data access through the trace bus 115. The system information indicates, for example, whether or not the CPU 71 is being operated, whether or not it is in the power saving mode, etc.

When trace data is transmitted through the trace bus 115, the encoder 77 computes the number of significant bits of the displacement of an address output from the branch detection unit 75. When the number of significant bits of the displacement of an address is obtained, the encoder 77 generates branch information obtained by adding the number of significant bits as tag data to the displacement of an address. Then, the value obtained by adding the number of bits of the tag data to the number of significant bits of the displacement of an address is compared with the bit width of an instruction address. If the value obtained by adding the number of bits of the tag data to the number of significant bits of the displacement of an address is equal to or larger than the bit width of an instruction address, then the branched-to absolute address output from the pipe line 73 is output as is to the multiplexer 86.

On the other hand, if the value obtained by adding the number of bits of the tag data to the number of significant bits of the displacement of an address is smaller than the bit width of an instruction address, then the value obtained by adding the tag data to the displacement of an address is output to the multiplexer 86.

In addition, the encoder 77 computes the number of significant bits for the number of instruction executing operations output from the instruction executing operation counter 74. When the number of significant bits of the number of instruction executing operations is obtained, the branch information obtained by adding the number of significant bits as tag data to the number of instruction executing operations is generated, and output to the multiplexer 86.

Regardless of the values of the displacement of an address and the number of significant bits of the number of instruction executing operations, the encoder 77 outputs an absolute address to the multiplexer 86 at least once in a predetermined period.

Figure 12:
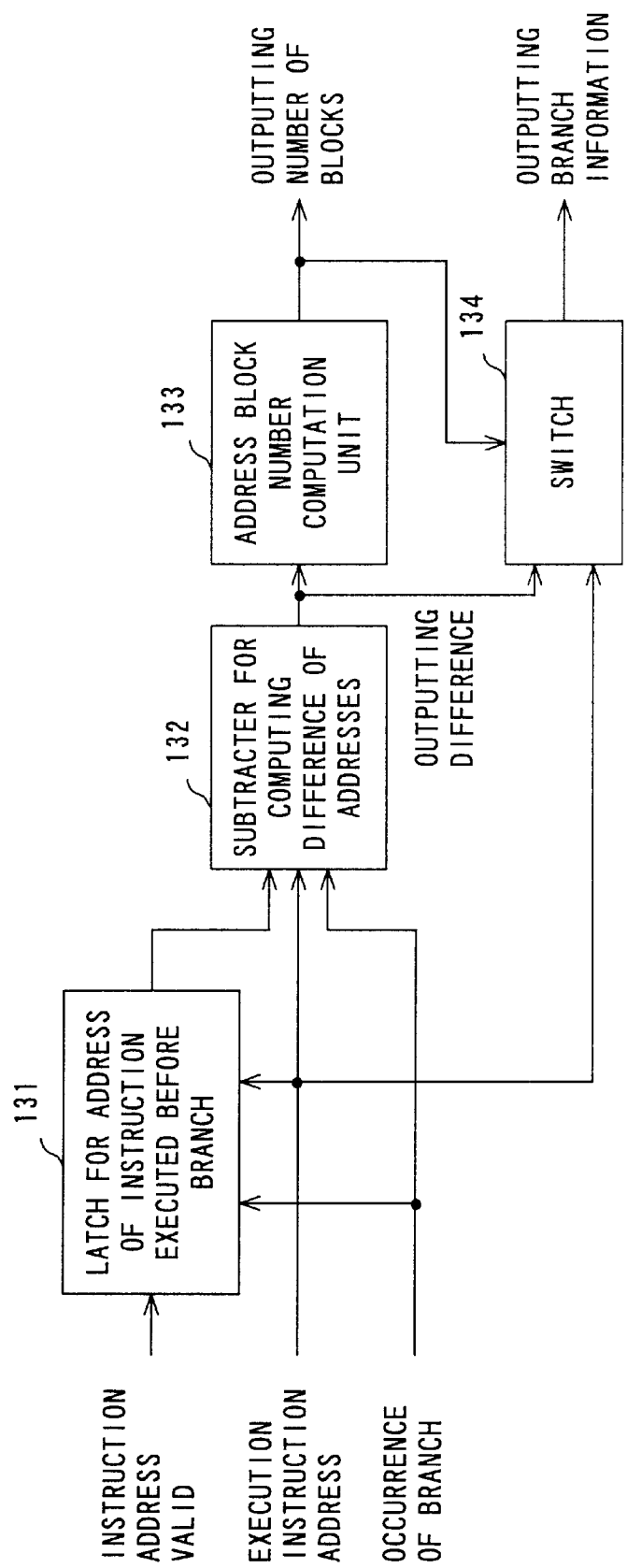
FIG. 12 is a block diagram of the configuration of a branch detection unit 75 and an encoder 77 shown in FIG. 11.

FIG. 12 is a block diagram of an example of the configuration of the branch detection unit 75 and the encoder 77 shown in FIG. 11.

In FIG. 12, a latch 131 receives an execution instruction address. When the instruction address is valid, the instruction address executed before a branch is latched. If a branch occurs, a subtracter 132 computes the difference between the execution instruction address stored in the latch 131 and the current execution instruction address, and outputs the result to an address block number computation unit 133 and a switch 134. The address block number computation unit 133 computes the number of address blocks of the difference in instruction address, and outputs the number of address blocks as tag data, and notifies the switch 134 of the number. When the number of address blocks is equal to or larger than a predetermined value, the switch 134 outputs the execution instruction address as is as branch information. When the number of address blocks is smaller than the predetermined value, the switch 134 outputs the difference in instruction address as branch information.

FIG. 13 is a flowchart of an example of an address block number computing process. According to the embodiment shown in FIG. 13, the bit width of an address is 32 bits, the number of bits per block is 4 bits. However, the number of bits per block can be set to correspond to the bit width of the trace bus 115. For example, when the FIFO 90 converts 32-bit parallel data into 4-bit parallel data and outputs the result, the number of bits per block is 4.

In FIG. 13, it is determined (step S21) whether or not the 31st through the 28th bits of the address are 0. If the 31st through the 28th bits of the address are not 0, then 7 is output as the number of address blocks (step S22).

When the 31st through the 28th bits of the address are 0, then it is determined (step S23) whether or not the 27th through 24th bits of the address are 0. If the 27th through 24th bits of the address are not 0, then 6 is output as the number of address blocks (step S24).

If the 27th through 24th bits of the address are 0, then it is determined (step S25) whether or not the 23rd through 20th bits of the address are 0. If the 23rd through 20th bits of the address are not 0, then 5 is output as the number of address blocks (step S26).

If the 23rd through 20th bits of the address are 0, it is determined (step S27) whether or not the 19th through 16th bits of the address are 0. If the 19th through 16th bits of the address are not 0, then 4 is output as the number of address blocks (step S28).

If the 19th through 16th bits of the address are 0, it is determined (step S29) whether or not the 15th through 12th bits of the address are 0. If the 15th through 12th bits of the address are not 0, then 3 is output as the number of address blocks (step S30).

If the 15th through 12th bits of the address are 0, then it is determined (step S31) whether or not the 11th through 8th bits of the address are 0. If the 11th through 8th bits of the address are not 0, then 2 is output as the number of address blocks (step S32).

If the 11th through 8th bits of the address are 0, then it is determined (step S33) whether or not the 7th through 4th bits of the address are 0. If the 7th through 4th bits of the address are not 0, then 1 is output as the number of address blocks (step S34).

If the 7th through 4th bits of the address are 0, 0 is output as the number of address blocks (step S35).

On the other hand, when trace data is transmitted through the trace bus 113, the encoder 77 transmits the instruction address transmitted from the pipe line 73 as is to the multiplexer 86.

The above described processes can be performed because the bit width of the trace bus 113 is set such that trace data can be output to the ICE 92 with no loss of trace data, and an absolute address can be output with the trace data efficiently analyzed even when the absolute address is output as is if no data is lost.

On the other hand, if data access is tried during the operations of the CPU 71, then the data address output to the data address bus 102 is transmitted to the encoder 81 through the buffer 79, and the data output to the data bus 103 is transmitted to the encoder 81 through the buffer 80. In addition, the data address output to the data address bus 102 is transmitted also to the comparison unit 85.

Upon receipt of the data address output to the data address bus 102, the comparison unit 85 compares it with the data address set in the register 84, and outputs the comparison result to the encoder 81.

When a data address and access data are input, the encoder 81 determines based on the comparison result transmitted from the comparison unit 85 whether or not the input data address and access data are to be processed. If it is determined that the input data address and access data are to be processed, then the control unit 87 is notified of the occurrence of data access, and the numbers of significant bits of the data address and access data are obtained by the encoder 81. Then, data access information is generated by adding the obtained numbers of significant bits as tag data to the data address and the access data, and the multiplexer 86 is notified of the generated data access information. In addition, the generated data access information is stored in the buffer 82, and added to the current data access information. Then, the multiplexer 86 is notified of delayed data access information.

Thus, the encoder 81 computes the number of address blocks by performing the process as shown in FIG. 13 on the data address. In addition, the number of data blocks is computed by performing the following process on the access data.

FIG. 14 is a flowchart of an example of the process of computing the number of data blocks.

In FIG. 14, it is determined (step S41) whether or not 32-bit access is gained. If 32-bit access is gained, then 7 is output as the number of data blocks (step S42).

If it is not determined that 32-bit access is gained, then it is determined (step S43) whether or not 16-bit access is gained. If 16-bit access is gained, then 3 is output as the number of data blocks (step S44).

If it is not determined that 16-bit access is gained, then 0 is output as the number of data blocks (step S45).

The control unit 87 monitors the occurrence of a branch notified by the branch detection unit 75, and the occurrence of data access notified by the encoder 81, and notifies the multiplexer 86 if a conflict has arisen between the occurrence of the branch and the occurrence of the data access.

When the multiplexer 86 is instructed to output trace data to the trace bus 115, the branch information transmitted from the encoder 77 and the data access information transmitted from the encoder 81 are output to the FIFO 90 through the signal line 114. Upon receipt of the occurrence of a conflict between a branch and data access, the multiplexer 86 selects the branch information from the encoder 77 and outputs it to the signal line 114, and then selects the delayed data access information from the encoder 81 and outputs it to the signal line 114.

On the other hand, when the multiplexer 86 is instructed to output trace data to the trace bus 113, it transmits the branch information transmitted from the encoder 77 and the data access information transmitted from the encoder 81 to the ICE 92 through the trace bus 113.

When the FIFO 90 receives branch information and data access information through the signal line 114, it stores the information as is. Then, the branch information and the data access information are read while adjusting the output timing of the branch information and the data access information. Then, the branch information and the data access information are converted, and then they are output to the ICE 92 is output through the trace bus 115. At this time, when the branch information and the data access information are read from the FIFO 90, the numbers of significant bits contained in the branch information and the data access information are retrieved, the data other than the data indicated by the numbers of significant bits is discarded, a parallel-serial converting process is performed, and the result is output to the ICE 92.

FIG. 15 is a block diagram of an example of the configuration of the FIFO 90 shown in FIG. 11.

In FIG. 15, the FIFO 90 comprises a 2-port RAM 141, a comparison circuit 142, and a parallel-serial converter 143. The 2-port RAM 141 has two sets of input/output terminals for addresses and data, so that two access requests can be simultaneously issued.

When trace data 145 is written to the 2-port RAM 141, the comparison circuit 142 compares the value of a write pointer 144 with the value of a read pointer 146, and transmits the comparison result to the control unit 87. The control unit 87 determines according to the comparison result transmitted from the comparison circuit 142 whether or not there is available space in the FIFO 90. If there is available space in the FIFO 90, then the value of the write pointer 144 is incremented, and the trace data 145 is written to the 2-port RAM 141.

When the trace data 145 is read from the 2-port RAM 141, the read pointer 146 checks whether or not the parallel-serial conversion has been completed by the parallel-serial converter 143 on the trace data 145 previously read from the 2-port RAM 141. If the parallel-serial conversion has been completed, then the value of the read pointer 146 is incremented, and the trace data 145 is read from the 2-port RAM 141 and output to the parallel-serial converter 143 and the encoder 91.

When the trace data 145 read from the 2-port RAM 141 is input, the parallel-serial converter 143 converts only the significant bit portions of the trace data 145 into serial data, and output the result to the ICE 92. When the parallel-serial conversion is completed on the trace data 145 read from the 2-port RAM 141, the parallel-serial converter 143 notifies the read pointer 146 of the completion.

When the trace data 145 read from the 2-port RAM 141 is input, the encoder 91 encodes the status of the data output to the trace bus 115, and outputs the result to the ICE 92 through the status output bus 116.

On the other hand, if the control unit 87 determines that there is no available space in the FIFO 90 when the comparison result is received from the comparison circuit 142, the control unit 87 performs a process according to the protocol for restoration performed when the output of data is delayed.

According to the restoration protocol, a data loss status is written to the end of the FIFO 90 when it is determined that there is no available space in the FIFO 90, and the input of the trace data to the FIFO 90 is suspended. Then, the trace data stored in the FIFO 90 is output to the ICE 92 through the trace bus 115, an operation of writing data to the FIFO 90 is resumed by the occurrence of a branch when there is available space in the FIFO 90, and an absolute address is written as branch information at the resumption of outputting data.

In the DSU 72 shown in FIG. 11, the timing adjusting FIFO 90 can be set in the register 89 to be used as the trace memory 93 by setting.

For example, assuming that the capacity of the FIFO 90 corresponds to 128 steps, the trace data for 128 steps is stored in the FIFO 90, and the trace data stored in the FIFO 90 cannot be output through the trace bus 115.

Thus, data can be prevented from being lost during the output of the trace data for 128 steps, thereby satisfying the user demand not to lose the trace data for 128 steps.

The trace data stored in the FIFO 90 can be analyzed by stopping the CPU 71 using a stop instruction from the ICE 92 side, passing control to the emulation program, and allowing the debugger to read trace data stored in the FIFO 90.

Figure 16:
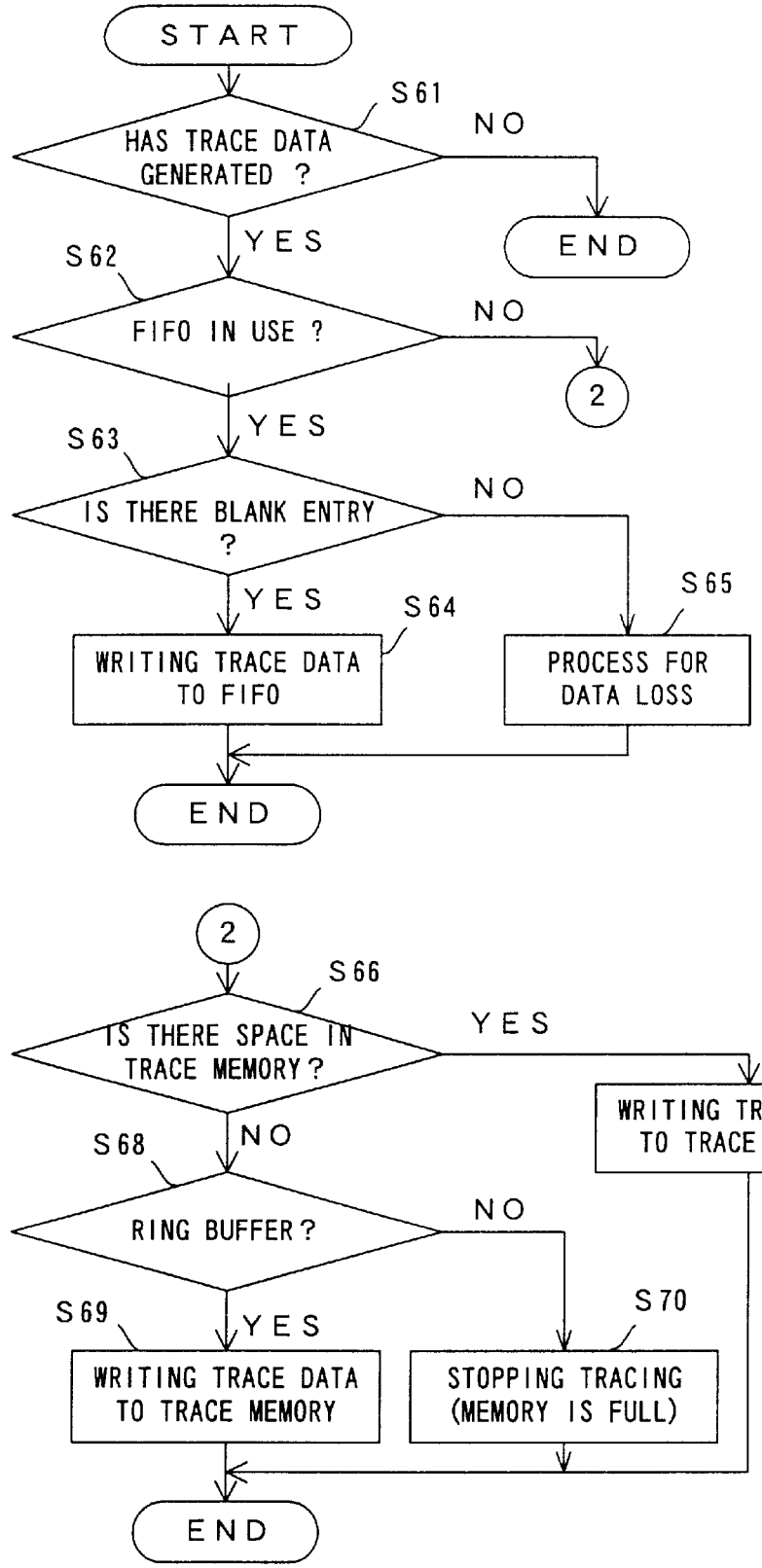
FIG. 16 is a flowchart of an example of the operations of a control unit 87.

FIG. 16 is a flowchart of an example of the operations of the control unit 87

In FIG. 16, when trace data is generated (step S61), it is determined (step S62) whether or not the FIFO 90 is being used as a timing adjusting buffer. If the FIFO 90 is being used as a timing adjusting buffer, then it is further determined (step S63) whether or not there is available space in the FIFO 90. If there is available space in the FIFO 90, trace data is written to the FIFO 90 (step S64). On the other hand, if there is no available space in the FIFO 90, then a process is performed for lost data (step S65). This process for lost data is performed according to the protocol for restoration in case the above described data is delayed in output.

On the other hand, if the FIFO 90 is not being used as a timing adjusting buffer, then it is further determined (step S66) whether or not there is available space in the trace memory. The case in which the FIFO 90 is not being used as a timing adjusting buffer refers to a case in which the FIFO 90 is specified to be used as trace memory, a case in which data is traced by the DSU 72 connecting trace memory externally to the accumulated chips, etc. When there is available space in the trace memory, the trace data is written to the trace memory (step S67).

On the other hand, if there is no available space in the trace memory, then it is determined (step S68) whether or not the trace memory is a ring buffer. If the trace memory is a ring buffer, then trace data is written to the trace memory (step S69). If the trace memory is not a ring buffer, then the tracing operation is stopped (step S70). When the trace memory is used as a ring buffer, new trace data is overwritten on an older portion of the trace data.

FIG. 17A shows the operation the pipe line 73 shown in FIG. 11, and also shows the internal operation timing of the CPU 71 for performing a pipeline operation when a branch instruction is executed.

In FIG. 17A, IF indicates an instruction fetch stage, ID indicates an instruction decode stage, EX is an operations stage, MA indicates a memory access stage, WB indicates an operations stage, MA is a memory access stage, WB is a write-back stage for writing back an operations result to a register. I through VII indicate the cycle of the CPU 71. Time passes in the right direction. JMP indicates a branch instruction. #0 indicates an instruction immediately after the branch instruction JMP. #1 indicates the first instruction at the branched-to address of the branch instruction JMP. x indicates that the instruction #0 has been canceled after being fetched by the branch instruction JMP.

The branch instruction JMP is fetched on cycle I. On cycle II, the branch instruction JMP is transmitted to the ID stage, and the instruction #0 is fetched. At this time, if an occurrence of a branch is detected as a result of decoding the branch instruction JMP, the instruction #0 immediately after the branch instruction JMP is canceled. As a result, on cycle III, the branch instruction JMP is transmitted to the EX stage, and space is generated by the canceled instruction at the ID stage. Then, a subsequent instruction #1 is fetched.

Next, on cycle IV, the branch instruction JMP is transmitted to the MA stage, the space of the canceled instruction is transmitted to the EX stage, and the instruction #1 is transmitted to the ID stage. On cycle V, the branch instruction JMP is transmitted to the EX stage, the space of the canceled instruction is transmitted to the MA stage, and the instruction #1 is transmitted to the WB stage. On cycle VI, the space of the canceled instruction is transmitted to the MA stage, and the instruction #1 is transmitted to the WB stage. On cycle VII, the instruction #1 is transmitted to the WB state.

FIG. 17B shows the method of generating a difference address at the execution of a branch instruction, and is obtained by extracting only the MA stage from FIG. 17A.

In FIG. 17B, a branched-from address and a branched-to address are required to obtain a difference address. Therefore, the difference address can be computed by latching the ranched-from address on cycle IV where the branch instruction JMP enters the MA stage, and performing the operation {(branched-to address)−(branched-from address)} by the branch detection unit 75 on cycle VI where the first instruction at the branched-to address enters the MA stage. The instruction trace data is generated based on the MA stage to synchronize with the generation of the trace data of the data access.

On the other hand, the trace data of data access is generated when actual access is gained at the MA stage according to an instruction associated with data access. Therefore, if no branch instructions JMP exist and the instruction #1 is a data access instruction in FIG. 17A, then the trace data of data access is generated on cycle VI. In this case, the data access information output from the encoder 81 is selected by the multiplexer 86, and transmitted to the FIFO 90.

Described below is the method of avoiding the conflict between a difference address generated by the occurrence of a branch and the trace data simultaneously generated by data access.

FIG. 17C shows the generation timing of a difference address generated by a branch and the trace data generated by data access, and shows the case in which the instruction #1 shown in FIG. 17A is a store instruction ST.

In FIG. 17C, when a branch and data access falls into a conflict, both data of a difference address for instruction trace and data access information are generated on cycle VI. In this case, the conflict detection unit 88 notifies the multiplexer 86 of the occurrence of a conflict between the branch and the data access. Upon receipt of the notification, the multiplexer 86 selects a difference address for an instruction trace, outputs it to the FIFO 90, then selects data access information delayed by 1 clock by the buffer 82, and outputs it to the FIFO 90. As a result, even when a branch and data access fall into a conflict, the consistency in timing between the branch information and data access information can be maintained, and the branch information and the data access information can be output through the common signal line 114.

If a branch occurs while data access is continuously gained, and data access information is delayed by 1 clock to transmit branch information, then the 1-clock delayed data access information and the current data access information fall into a conflict. In this case, the conflicting data access information can be absorbed by the space of an instruction canceled immediately after the occurrence of a branch.

As described above, according to the present embodiment, two pieces of information, that is, instruction execution and data access, can be output through a single trace bus as a trace result, and the number of trace terminals can be reduced when the latest high-speed system is installed, thereby easily realizing the entire system including an ICE without lowering the levels of functions.

In addition, the redundant portions of output instruction can be reduced and therefore the density of the information output to a trace bus can be improved, thereby outputting a larger volume of trace information without increasing the bit width of the trace bus.

As described above, according to the present invention, an output bus for outputting data access information can also be used as an output bus for outputting branch information by inserting the branch information into an output sequence of data access information, thereby reducing the number of pins of a package required to output trace data.

According to an aspect of the present invention, when a conflict between an output of branch information and an output of data access information is detected, the consistency in timing between the branch information and data access information can be maintained, and the branch information and the data access information can be output through the common signal line by outputting the data access information after outputting the branch information.

In addition, according to another aspect of the present invention, an instruction canceled by the occurrence of a branch is not output so that the output of unnecessary data can be suppressed, and only the information required to analyze a tracing operation can be output.

According to a further aspect of the present invention, information can be serially output with the reduced number of necessary clocks by outputting only the number of significant digits of the displacement of an address occurring from a branch and the number of instruction executing operations. As a result, trace data can be output at a high speed.

According to a further aspect of the present invention, the number of significant digits and branch information can be simultaneously transferred by containing the number of significant digits in the branch information, thereby synchronously outputting the number of significant digits and the branch information.

According to a further aspect of the present invention, when the number of significant digits of a relative address is larger than the number of digits of an absolute address, the relative address is not output, but the absolute address is output as is as branch information, thereby efficiently outputting trace data.

According to a further aspect of the present invention, only the numbers of significant digits of data address and access data are output, thereby efficiently outputting data access information.

According to a further aspect of the present invention, since an absolute address is output at least once in a predetermined period, the trace data can be easily analyzed, and non-traceable portions can be reduced even when data are lost.

According to a further aspect of the present invention, the data read from an output timing adjusting buffer is parallel-serial converted and output, and the decoding result of the data is simultaneously output, thereby synchronously outputting the information.

According to a further aspect of the present invention, in addition to an output bus for outputting parallel-serial converted trace data, an output bus for outputting trace data as is in parallel. Therefore, an absolute address is output as branch information, thereby outputting trace data without losing data.

According to a further aspect of the present invention, when trace data is output as is as parallel data, the system information can be output from a residual output bus, thereby efficiently utilizing the output buses.

According to a further aspect of the present invention, when an output timing adjusting buffer becomes full, a data loss status is written to the buffer, and then writing data to the buffer is suspended, thereby successfully protecting the data already written to the buffer before the data has been lost, and locating the position where the data has been lost.

According to a further aspect of the present invention, an operation of writing data to a buffer can be resumed from the point at which a branch has occurred, and an absolute address is written to the buffer as the branch information at that time, thereby efficiently tracing data.

According to a further aspect of the present invention, a buffer can be used as trace memory so that the amount of data corresponding to the capacity of the buffer can be protected from being lost, and the trace data can be maintained. As a result, debugging the trace data can be guaranteed without any lost data.

What is claimed is:

1. An information processing apparatus comprising:
    a branch occurrence detection unit detecting an occurrence of a branch while an instruction is being executed;
    a branch information generation unit generating branch information relating to the branch;
    a data access information generation unit generating data access information for data access; and
    a data output unit for outputting the branch information after inserting the branch information into an output sequence of the data access information, wherein said data output unit comprises:
        a delay unit delaying the data access information;
        a conflict detection unit detecting a conflict between an output of the branch information and an output of the data access information, wherein
        when the conflict is detected, said data output unit outputs data access information delayed by said delay unit after outputting the branch information.

2. An information processing apparatus comprising:
    a branch occurrence detection unit detecting an occurrence of a branch while an instruction is being executed;
    a branch information generation unit generating branch information relating to the branch;
    a data access information generation unit generating data access information for data access;
    a data output unit for outputting the branch information after inserting the branch information into an output sequence of the data access information; and
    a canceled instruction detection unit detecting an instruction canceled by the occurrence of the branch, wherein said data output unit does not output the canceled instruction.

3. An information processing apparatus comprising:
    a branch occurrence detection unit detecting an occurrence of a branch while an instruction is being executed;
    a branch information generation unit generating branch information relating to the branch, wherein said branch information generation unit comprises:
        an address displacement computation unit computing displacement of an address by the branch; an instruction executing operation number computation unit computing a number of instruction executing operations from the occurrence of the branch to an occurrence of a next branch;
        a first significant digit number computation unit computing a number of significant digits of a computation result obtained by said address displacement computation unit; and
        a second significant digit number computation unit computing a number of significant digits of a computation result obtained by said instruction executing operation number computation unit, wherein
        said data output unit outputs only numbers of significant digits of the displacement of an address and the number of instruction executing operations as the branch information;
    a data access information generation unit generating data access information for data access; and
    a data output unit for outputting the branch information after inserting the branch information into an output sequence of the data access information.

4. The apparatus according to claim 3, wherein said branch information generation unit contains the number of significant digits in the branch information.

5. The apparatus according to claim 3, further comprising:
    a comparison unit comparing a number of significant digits of a relative address generated by said branch information generation unit with a number of digits of an absolute address from the branch, wherein
    said data output unit switches and outputs the relative address or the absolute address based on the comparison result.

6. The apparatus according to claim 3, wherein
    said data output unit outputs an absolute address, not a relative address, at least once in a predetermined period.

7. An information processing apparatus comprising:
    a branch occurrence detection unit detecting an occurrence of a branch while an instruction is being executed;
    a branch information generation unit generating branch information relating to the branch;

a data access information generation unit generating data access information for data access, wherein said data access information generation unit comprises:
  a third significant digit number computation unit computing a number of significant digits of a data address;
  a fourth significant digit number computation unit computing a number of significant digits of access data; and
  a data output unit for outputting the branch information after inserting the branch information into an output sequence of the data access information, wherein
  said data output unit outputs only the number of significant digits of the data address and the access data as the data access information.

8. The apparatus according to claim 7, wherein said data output unit outputs an absolute address, not a relative address, at least once in a predetermined period.

9. An information processing apparatus comprising:
  a branch occurrence detection unit detecting an occurrence of a branch while an instruction is being executed;
  a branch information generation unit generating branch information relating to the branch;
  a data access information generation unit generating data access information for data access; and
  a data output unit for outputting the branch information after inserting the branch information into an output sequence of the data access information, wherein said data output unit comprises:
    a buffer adjusting an output timing of output data;
    a parallel-serial conversion unit parallel-serial converting data read from said buffer, wherein said parallel-serial conversion unit truncates a portion other than significant digits of output data;
    a first output bus outputting parallel-serial converted data;
    a decoding unit decoding data read from said buffer; and
    a second output bus outputting based on a decoding result a status of data output from said first output bus.

10. An information processing apparatus comprising:
  a branch occurrence detection unit detecting an occurrence of a branch while an instruction is being executed;
  a branch information generation unit generating branch information relating to the branch;
  a data access information generation unit generating data access information for data access; and
  a data output unit for outputting the branch information after inserting the branch information into an output sequence of the data access information, wherein said data output unit comprises:
    a buffer adjusting an output timing of output data;
    a parallel-serial conversion unit parallel-serial converting data read from said buffer;
    a first output bus outputting parallel-serial converted data;
    a decoding unit decoding data read from said buffer;
    a second output bus outputting based on a decoding result a status of data output from said first output bus; and
    a third output bus outputting, in parallel, data input to said data output unit, and branch information output from said third output bus is an absolute address.

11. The apparatus according to claim 10, wherein when branch information and data access information are output from said third output bus, said data output unit outputs system information excluding the branch information and the data access information from said first output bus.

12. An information processing apparatus comprising:
  a branch occurrence detection unit detecting an occurrence of a branch while an instruction is being executed;
  a branch information generation unit generating branch information relating to the branch;
  a data access information generation unit generating data access information for data access; and
  a data output unit for outputting the branch information after inserting the branch information into an output sequence of the data access information, wherein said data output unit comprises:
    a buffer adjusting an output timing of output data;
    a parallel-serial conversion unit parallel-serial converting data read from said buffer;
    a first output bus outputting parallel-serial converted data;
    a decoding unit decoding data read from said buffer;
    a second output bus outputting based on a decoding result a status of data output from said first output bus;
    a writing unit writing data loss status to said buffer when said buffer becomes full; and
    a suspending unit suspending a write to said buffer after writing the data loss status.

13. The apparatus according to claim 12, wherein when a branch occurs after there is space in said buffer, said data output unit first writes an absolute address as branch information to said buffer, and then resumes writing data to said buffer.

14. A method for outputting trace data, comprising the steps of:
  detecting an occurrence of a branch while an instruction is being executed;
  detecting a conflict between the occurrence of the branch and data access;
  when the conflict is detected, outputting information about the data access after outputting information about the branch.

15. A method for outputting trace data, comprising the steps of:
  computing a number of instruction executing operations from the occurrence of the branch to an occurrence of a next branch;
  computing a number of significant digits of the displacement of an address and the number of instruction executing operations; and
  outputting only portions of significant digits of the displacement of an address and the number of instruction executing operations as the branch information.

16. A method of outputting trace data, comprising the steps of:
  writing a data loss status to a trace data output timing adjusting buffer when the buffer is full;
  suspending a write of data to the buffer;
  writing an absolute address as branch information to the buffer when a branch occurs after there is space in the buffer; and
  resuming a write of data to the buffer.

* * * * *